United States Patent
Nellans et al.

(10) Patent No.: US 9,251,087 B2
(45) Date of Patent: Feb. 2, 2016

(54) APPARATUS, SYSTEM, AND METHOD FOR VIRTUAL MEMORY MANAGEMENT

(75) Inventors: David Nellans, Salt Lake City, UT (US); Robert Wipfel, Draper, UT (US)

(73) Assignee: SanDisk Technologies, Inc., Plano, TX (US)

( * ) Notice: Subject to any disclaimer, the term of this patent is extended or adjusted under 35 U.S.C. 154(b) by 1002 days.

(21) Appl. No.: 13/372,474

(22) Filed: Feb. 13, 2012

(65) Prior Publication Data

US 2012/0210095 A1 Aug. 16, 2012

Related U.S. Application Data

(60) Provisional application No. 61/442,118, filed on Feb. 11, 2011.

(51) Int. Cl.
*G06F 13/00* (2006.01)
*G06F 13/28* (2006.01)
*G06F 12/10* (2006.01)

(52) U.S. Cl.
CPC ............ *G06F 12/10* (2013.01); *G06F 12/1072* (2013.01)

(58) Field of Classification Search
CPC ....................................................... G06F 12/10
See application file for complete search history.

(56) References Cited

U.S. PATENT DOCUMENTS

| | | | |
|---|---|---|---|
| 6,983,467 B2 | 1/2006 | Engstrom et al. | |
| 7,096,378 B2 | 8/2006 | Stence et al. | |
| 7,178,068 B2 | 2/2007 | Maison et al. | |
| 7,421,533 B2 * | 9/2008 | Zimmer et al. | 711/6 |
| 7,610,523 B1 | 10/2009 | Singh | |
| 2005/0055528 A1 * | 3/2005 | Arimilli et al. | 711/203 |
| 2006/0161751 A1 | 7/2006 | Barrs et al. | |
| 2008/0028180 A1 * | 1/2008 | Newman et al. | 711/206 |
| 2008/0082751 A1 | 4/2008 | Okin et al. | |
| 2009/0248959 A1 * | 10/2009 | Tzeng | 711/103 |
| 2010/0082892 A1 | 4/2010 | Ma et al. | |
| 2010/0115204 A1 | 5/2010 | Li et al. | |
| 2010/0169544 A1 * | 7/2010 | Eom et al. | 711/103 |
| 2011/0153916 A1 | 6/2011 | Chinnaswamy et al. | |

FOREIGN PATENT DOCUMENTS

WO 2011087595 7/2011

OTHER PUBLICATIONS

Application No. PCT/US2012/024930, 2380.2.61pct, P201103pct, International Preliminary Report on Patentability, Aug. 22, 2013.
2380.2.61pct, P201103PCT, Application No. PCT/US2012/024930, International Search Report and Written Opinion, Oct. 25, 2012.

* cited by examiner

*Primary Examiner* — Eric S Cardwell
(74) *Attorney, Agent, or Firm* — Kunzler Law Group, PC

(57) ABSTRACT

An apparatus, system, and method for virtual memory management. The method includes detecting a memory access to a virtual memory address within a monitored page of data not loaded in main memory of a computing device. The method includes determining a first address for a loaded page of data in the main memory. The first address is defined in a sparse virtual address space exposed by a persistent storage device. The first address is associated in an index with a first deterministic storage location. The method includes storing the loaded page on a persistent storage device at the first deterministic storage location. The method includes moving the monitored page from a second deterministic storage location to the main memory. The second deterministic storage location is associated with a second address in the index.

23 Claims, 20 Drawing Sheets

APPARATUS, SYSTEM, AND METHOD FOR VIRTUAL MEMORY MANAGEMENT

CROSS-REFERENCES TO RELATED APPLICATIONS

This application claims priority to U.S. Provisional Patent Application No. 61/442,118 entitled "APPARATUS, SYSTEM, AND METHOD FOR APPLICATION DIRECT VIRTUAL MEMORY MANAGEMENT" and filed on Feb. 11, 2011 for David Nellans et al., which is incorporated herein by reference.

BACKGROUND

1. Field

The subject matter disclosed herein relates to virtual memory management and more particularly relates to performing virtual memory management directly for an application.

2. Description of the Related Art

In typical virtual memory management, in a process called "paging" or "swapping" an operating system or other swap manager moves an application's data between main memory and persistent storage. The operating system may remove certain data pages from main memory, such as those not recently accessed, to make room for other data pages for access by the application. The operating system typically maintains its own tables and/or indexes to determine where to store a particular data page onto persistent storage, or where to find a particular data page on persistent storage when performing virtual memory swapping.

Furthermore, operating systems or other swap managers typically do not differentiate between applications when performing virtual memory swapping.

BRIEF SUMMARY

A method is presented for application direct virtual memory management. In one embodiment, the method includes detecting a memory access to a virtual memory address within a monitored page of data not loaded in main memory of a computing device. In one embodiment, the method includes determining a first address for a loaded page of data in the main memory. The first address, in certain embodiments, is defined in a sparse virtual address space exposed by a persistent storage device and the first address is associated in an index with a first deterministic storage location. In one embodiment, the method includes storing the loaded page on a persistent storage device at the first deterministic storage location. In one embodiment, the method includes copying the monitored page from a second deterministic storage location to the main memory. The second deterministic storage location, in certain embodiments, is associated with a second address in the index.

The apparatus for virtual memory management is provided with a plurality of modules including a determination module, a storing module, and a moving module.

In certain embodiments, the determination module determines a first address for a loaded page of data in Random Access Memory (RAM). The first address, in certain embodiments, is defined in a sparse virtual address space exposed by a persistent storage device. In one embodiment, the first address is associated in an index with a first deterministic storage location. In one embodiment, the storing module stores the loaded page on a persistent storage device at the first deterministic storage location. In one embodiment, the moving module copies a monitored page of data not loaded in RAM from a second deterministic storage location on a persistent storage device to the RAM. The second deterministic storage location, in certain embodiments, is associated with a second address in the index.

A system is also presented for virtual memory management. The system may be embodied by a persistent storage device in communication with a host device, a device driver for the persistent storage device, and a user space library. In particular, in one embodiment, the device driver exposes a sparse virtual address space. In one embodiment, the user space library includes a detection module, a determination module, a storing module, and a moving module.

In one embodiment, the detection module detects a memory access to a virtual memory address within a monitored range of virtual memory addresses not loaded in volatile memory of a computing device. In certain embodiments, the determination module determines a first address for a loaded page of data in volatile memory. The first address, in certain embodiments, is defined in a sparse virtual address space exposed by a persistent storage device. In one embodiment, the first address is associated in an index with a first deterministic storage location. In one embodiment, the storing module stores the loaded page on a persistent storage device at the first deterministic storage location. In one embodiment, the moving module moves data at the monitored range of virtual memory addresses from a second deterministic storage location to volatile memory. The second deterministic storage location, in certain embodiments, is associated with a second address in the index.

Another method is presented for virtual memory management. In one embodiment, the method includes receiving a memory request to a virtual memory address within a monitored range of virtual memory addresses having data stored on a persistent storage device. In one embodiment, the method includes storing data residing in main memory pertaining to a second range of virtual memory addresses to a persistent storage device at a first deterministic storage location. The first deterministic storage location, in certain embodiments, is associated with a first virtual memory address in an index. In one embodiment, the method includes transferring data at the monitored range of virtual memory addresses from a second deterministic storage location to a second virtual memory address in the main memory. The second deterministic storage location, in certain embodiments, is associated with a second virtual memory address in the index.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
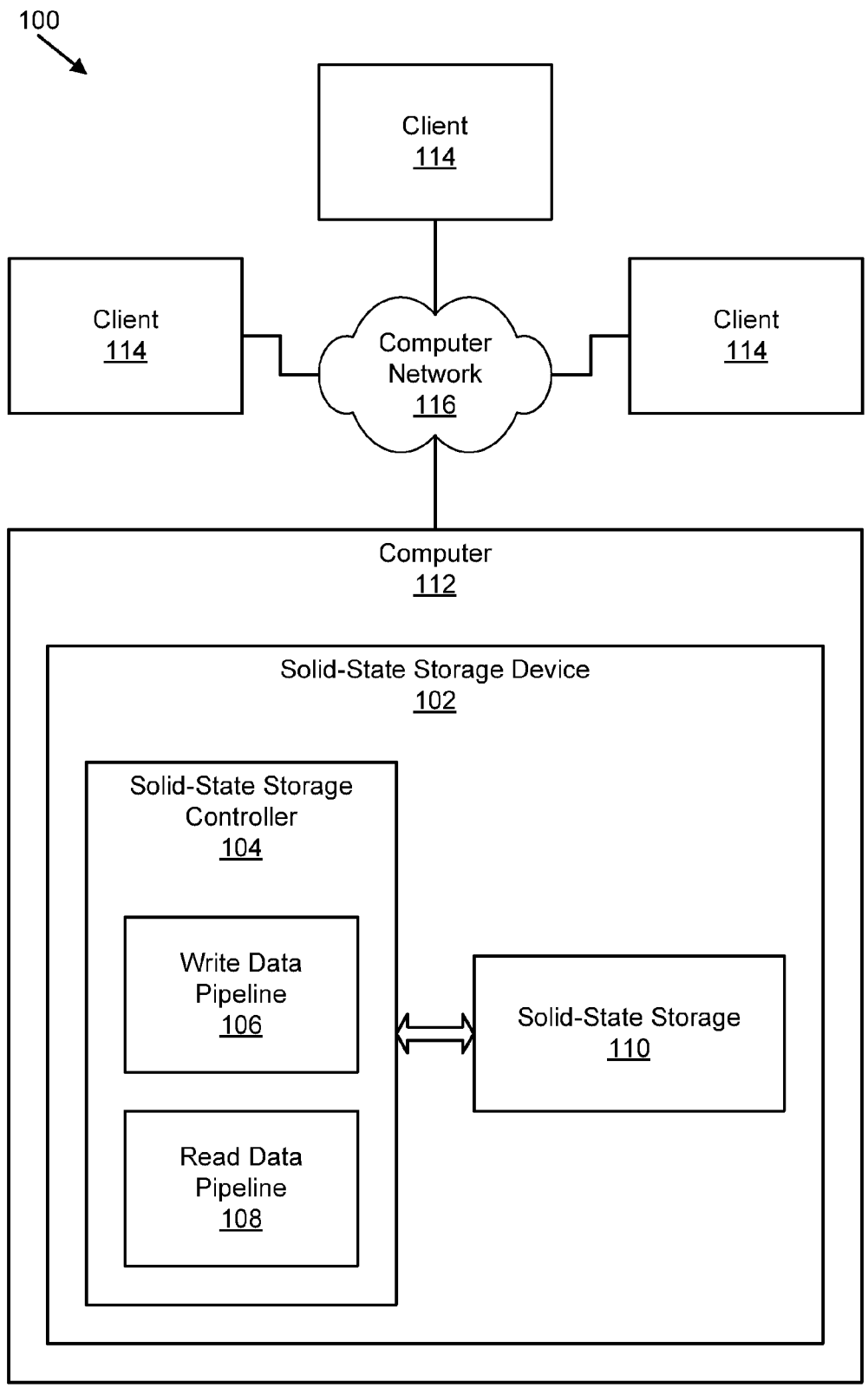
FIG. 1 is a schematic block diagram illustrating one embodiment of a solid-state storage system in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on or in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Solid-State Storage System

FIG. 1 is a schematic block diagram illustrating one embodiment of a system 100 for improving performance in a solid-state storage device in accordance with the present invention. The system 100 includes a solid-state storage device 102, a solid-state storage controller 104, a write data pipeline 106, a read data pipeline 108, a solid-state storage 110, a computer 112, a client 114, and a computer network 116, which are described below.

The system 100 includes at least one solid-state storage device 102. In another embodiment, the system 100 includes two or more solid-state storage devices 102. Each solid-state storage device 102 may include non-volatile, solid-state storage 110, such as flash memory, nano random access memory ("nano RAM or NRAM"), magneto-resistive RAM ("MRAM"), dynamic RAM ("DRAM"), phase change RAM ("PRAM"), etc. In further embodiments, the data storage device 102 may include other types of non-volatile and/or volatile data storage, such as dynamic RAM ("DRAM"), static RAM ("SRAM"), magnetic data storage, optical data storage, and/or other data storage technologies.

Figure 2:
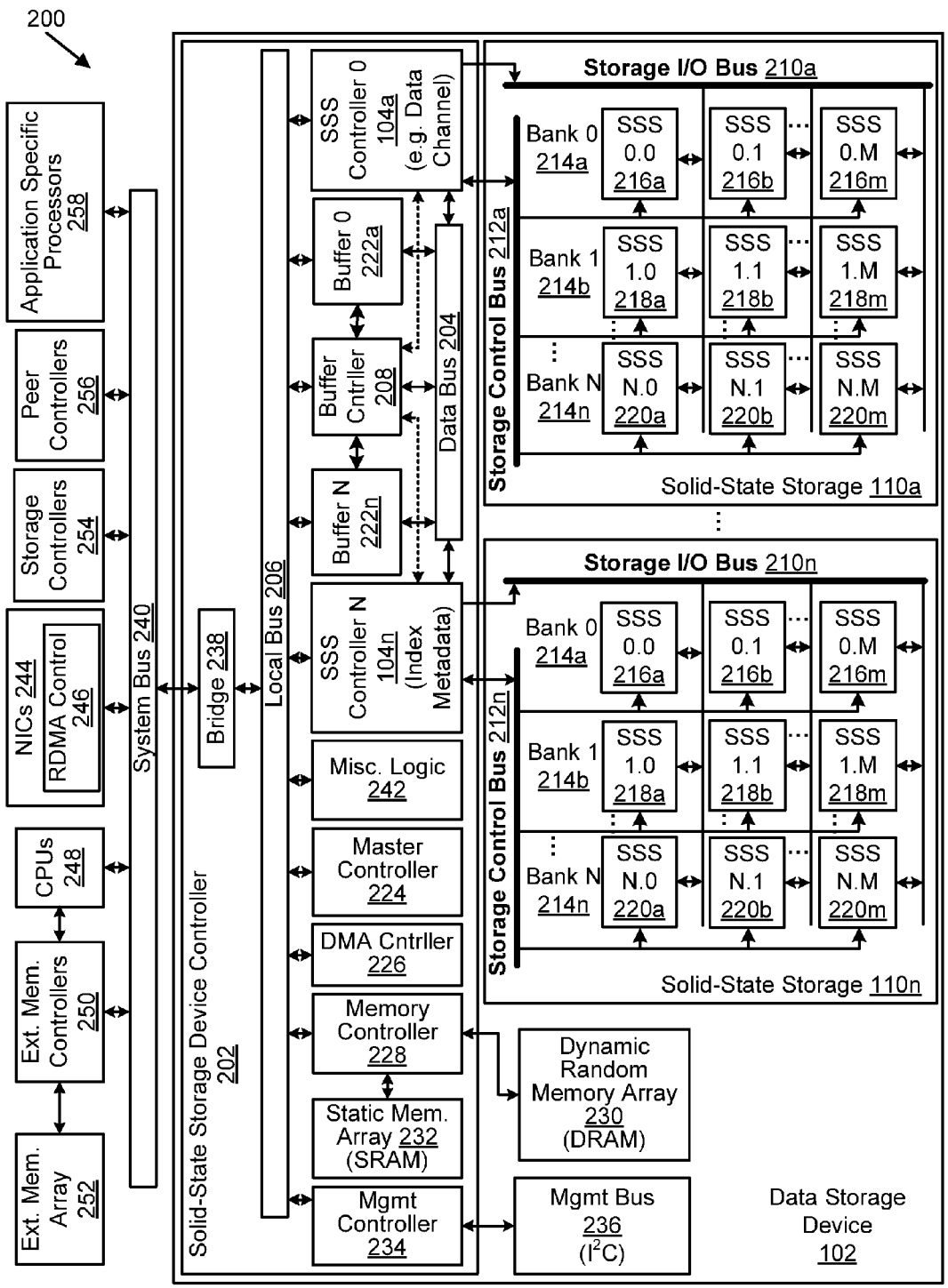
FIG. 2 is a schematic block diagram illustrating one embodiment of a solid-state storage device controller in solid-state storage device in accordance with the present invention.
Figure 3:
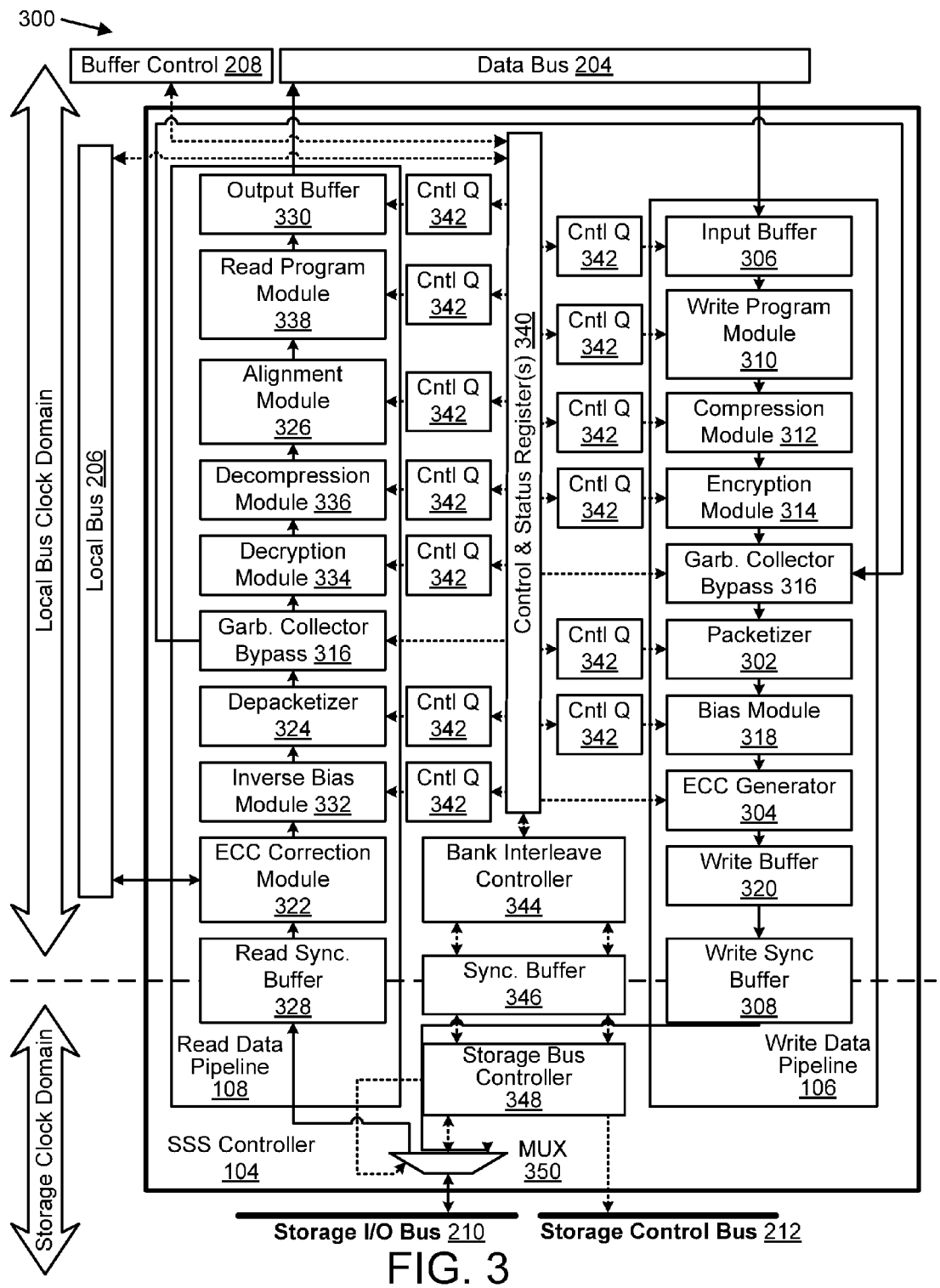
FIG. 3 is a schematic block diagram illustrating one embodiment of a solid-state storage controller with a write data pipeline and a read data pipeline in a solid-state storage device in accordance with the present invention.

The solid-state storage device 102 is described in more detail with respect to FIGS. 2 and 3. The solid-state storage device 102 is depicted in a computer 112 connected to a client 114 through a computer network 116. In one embodiment, the solid-state storage device 102 is internal to the computer 112 and is connected using a system bus, such as a peripheral component interconnect express ("PCI-e") bus, a Serial Advanced Technology Attachment ("serial ATA") bus, or the like. In another embodiment, the solid-state storage device 102 is external to the computer 112 and is connected, a universal serial bus ("USB") connection, an Institute of Electrical and Electronics Engineers ("IEEE") 1394 bus ("FireWire"), or the like. In other embodiments, the solid-state storage device 102 is connected to the computer 112 using a peripheral component interconnect ("PCI") express bus using external electrical or optical bus extension or bus networking solution such as Infiniband or PCI Express Advanced Switching ("PCIe-AS"), or the like.

In various embodiments, the solid-state storage device 102 may be in the form of a dual-inline memory module ("DIMM"), a daughter card, or a micro-module. In another embodiment, the solid-state storage device 102 is an element within a rack-mounted blade. In another embodiment, the solid-state storage device 102 is contained within a package that is integrated directly onto a higher level assembly (e.g. mother board, lap top, graphics processor). In another embodiment, individual components comprising the solid-state storage device 102 are integrated directly onto a higher level assembly without intermediate packaging.

The solid-state storage device 102 includes one or more solid-state storage controllers 104, each may include a write data pipeline 106 and a read data pipeline 108 and each includes a solid-state storage 110, which are described in more detail below with respect to FIGS. 2 and 3.

The system 100 includes one or more computers 112 connected to the solid-state storage device 102. A computer 112 may be a host, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a computer 112 may be a client and the solid-state storage device 102 operates autonomously to service data requests sent from the computer 112. In this embodiment, the computer 112 and solid-state storage device 102 may be connected using a computer network, system bus, Direct Attached Storage (DAS) or other communication means suitable for connection between a computer 112 and an autonomous solid-state storage device 102.

In one embodiment, the system 100 includes one or more clients 114 connected to one or more computer 112 through one or more computer networks 116. A client 114 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The computer network 116 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network 116 may also include a network from the IEEE 802 family of network technologies, such Ethernet, token ring, WiFi, WiMax, and the like.

In a further embodiment, instead of being connected directly to the computer 112 as DAS, the data storage device 102 may be connected to the computer 112 over a data network. For example, the data storage device 102 may include a storage area network ("SAN") storage device, a network attached storage ("NAS") device, a network share, or the like. In one embodiment, the system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the computer 112 and the data storage device 102.

The computer network 116 may include servers, switches, routers, cabling, radios, and other equipment used to facilitate networking computers 112 and clients 114. In one embodiment, the system 100 includes multiple computers 112 that communicate as peers over a computer network 116. In another embodiment, the system 100 includes multiple solid-state storage devices 102 that communicate as peers over a computer network 116. One of skill in the art will recognize other computer networks 116 comprising one or more computer networks 116 and related equipment with single or redundant connection between one or more clients 114 or other computer with one or more solid-state storage devices 102 or one or more solid-state storage devices 102 connected to one or more computers 112. In one embodiment, the system 100 includes two or more solid-state storage devices 102 connected through the computer network 116 to a client 114 without a computer 112.

In one embodiment, the data storage device 102 has a block device interface that support block device commands. For example, the first data storage device 102 may support the ATA interface standard, the ATA Packet Interface ("ATAPI") standard, the small computer system interface ("SCSI") standard, and/or the Fibre Channel standard which are maintained by the InterNational Committee for Information Technology Standards ("INCITS").

Solid-State Storage Device

FIG. 2 is a schematic block diagram illustrating one embodiment 200 of a solid-state storage device controller 202 that includes a write data pipeline 106 and a read data pipeline 108 in a solid-state storage device 102 in accordance with the present invention. The solid-state storage device controller 202 may be embodied as hardware, as software, or as a combination of hardware and software. The solid-state storage device controller 202 may include a number of solid-state storage controllers 0-N 104a-n, each controlling solid-state storage media 110. In the depicted embodiment, two solid-state controllers are shown: solid-state controller 0 104a and solid-state storage controller N 104n, and each controls solid-state storage media 110a-n. In the depicted embodiment, solid-state storage controller 0 104a controls a data channel so that the attached solid-state storage media 110a stores data. Solid-state storage controller N 104n controls an index metadata channel associated with the stored data and the associated solid-state storage media 110n stores index metadata. In an alternate embodiment, the solid-state storage device controller 202 includes a single solid-state controller 104a with a single solid-state storage media 110a. In another embodiment, there are a plurality of solid-state storage controllers 104a-n and associated solid-state storage media 110a-n. In one embodiment, one or more solid-state controllers 104a-104n-1, coupled to their associated solid-state storage media 110a-110n-1, control data while at least one solid-state storage controller 104n, coupled to its associated solid-state storage media 110n, controls index metadata.

In one embodiment, at least one solid-state controller 104 is field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or custom logic solution. Each solid-state storage controller 104 typically includes a write data pipeline 106 and a read data pipeline 108, which are describe further in relation to FIG. 3. In another embodiment, at least one solid-state storage controller 104 is made up of a combination FPGA, ASIC, and custom logic components.

Solid-State Storage

The solid-state storage media 110 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage media 110, data cannot be read from the solid-state storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A solid-state storage element (e.g. SSS 0.0 216a) is typically configured as a chip (a package of one or more dies) or a die on a circuit board. As depicted, a solid-state storage element (e.g. 216a) operates independently or semi-independently of other solid-state storage elements (e.g. 218a) even if these several elements are packaged together in a chip package, a stack of chip packages, or some other package element. As depicted, a row of solid-state storage elements 216a, 216b, 216m is designated as a bank 214. As depicted, there may be "n" banks 214a-n and "m" solid-state storage elements 216a-m, 218a-m, 220a-m per bank in an array of n×m solid-state storage elements 216, 218, 220 in a solid-state storage media 110. Of course different embodiments may include different values for n and m. In one embodiment, the solid-state storage media 110a includes twenty solid-state storage elements 216, 218, 220 per bank 214 with eight banks 214. In one embodiment, the solid-state storage media 110a includes twenty four solid-state storage elements 216, 218, 220 per bank 214 with eight banks 214. In addition to the n×m storage elements 216, 218, 220, one or more additional columns (P) may also be addressed and operated in parallel with other solid-state storage elements 216a, 216b, 216m for one or more rows. The added P columns in one embodiment, store parity data for the portions of an ECC chunk (i.e. an ECC codeword) that span m storage elements for a particular bank. In one embodiment, each solid-state storage element 216, 218, 220 is comprised of single-level cell ("SLC") devices. In another embodiment, each solid-state storage element 216, 218, 220 is comprised of multi-level cell ("MLC") devices.

In one embodiment, solid-state storage elements that share a common storage I/O bus 210a (e.g. 216b, 218b, 220b) are packaged together. In one embodiment, a solid-state storage element 216, 218, 220 may have one or more dies per chip with one or more chips stacked vertically and each die may be accessed independently. In another embodiment, a solid-state storage element (e.g. SSS 0.0 216a) may have one or more virtual dies per die and one or more dies per chip and one or more chips stacked vertically and each virtual die may be accessed independently. In another embodiment, a solid-state storage element SSS 0.0 216a may have one or more virtual dies per die and one or more dies per chip with some or all of the one or more dies stacked vertically and each virtual die may be accessed independently.

In one embodiment, two dies are stacked vertically with four stacks per group to form eight storage elements (e.g. SSS 0.0-SSS 8.0) 216a-220a, each in a separate bank 214a-n. In another embodiment, 24 storage elements (e.g. SSS 0.0-SSS 0.24) 216 form a logical bank 214a so that each of the eight logical banks has 24 storage elements (e.g. SSS0.0-SSS 8.24) 216, 218, 220. Data is sent to the solid-state storage media 110 over the storage I/O bus 210 to all storage elements of a particular group of storage elements (SSS 0.0-SSS 8.0) 216a, 218a, 220a. The storage control bus 212a is used to select a particular bank (e.g. Bank 0 214a) so that the data received over the storage I/O bus 210 connected to all banks 214 is written just to the selected bank 214a.

In a one embodiment, the storage I/O bus 210 is comprised of one or more independent I/O buses ("IIOBa-m" comprising 210a.a-m, 210n.a-m) wherein the solid-state storage elements within each column share one of the independent I/O buses that accesses each solid-state storage element 216, 218, 220 in parallel so that all banks 214 are accessed simultaneously. For example, one channel of the storage I/O bus 210 may access a first solid-state storage element 216a, 218a, 220a of each bank 214a-n simultaneously. A second channel of the storage I/O bus 210 may access a second solid-state storage element 216b, 218b, 220b of each bank 214a-n simultaneously. Each row of solid-state storage element 216a, 216b, 216m is accessed simultaneously. In one embodiment, where solid-state storage elements 216, 218, 220 are multi-level (physically stacked), all physical levels of the solid-state storage elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one level of a multi-level solid-state storage element 216, 218, 220. In other embodiments, other commands are used by the storage control bus 212 to individually select one level of a multi-level solid-state storage element 216, 218, 220. Solid-state storage elements 216, 218, 220 may also be selected through a combination of control and of address information transmitted on storage I/O bus 210 and the storage control bus 212.

In one embodiment, each solid-state storage element 216, 218, 220 is partitioned into erase blocks and each erase block is partitioned into pages. An erase block on a solid-state storage element 216, 218 220 may be called a physical erase block or "PEB." A typical page is 2000 bytes ("2 kB"). In one example, a solid-state storage element (e.g. SSS 0.0) includes two registers and can program two pages so that a two-register solid-state storage element 216, 218, 220 has a capacity of 4 kB. A bank 214 of 20 solid-state storage elements 216a, 216b, 216m would then have an 80 kB capacity of pages accessed with the same address going out the channels of the storage I/O bus 210.

This group of pages in a bank 214 of solid-state storage elements 216a, 216b, 216m of 80 kB may be called a logical page or virtual page. Similarly, an erase block of each storage element 216a-m of a bank 214a may be grouped to form a logical erase block or a virtual erase block. In one embodiment, an erase block of pages within a solid-state storage element 216, 218, 220 is erased when an erase command is received within a solid-state storage element 216, 218, 220. Whereas the size and number of erase blocks, pages, planes, or other logical and physical divisions within a solid-state storage element 216, 218, 220 are expected to change over time with advancements in technology, it is to be expected that many embodiments consistent with new configurations are possible and are consistent with the general description herein.

Typically, when a packet is written to a particular location within a solid-state storage element 216, 218, 220, wherein the packet is intended to be written to a location within a particular page which is specific to a particular physical erase block of a particular storage element of a particular bank, a physical address is sent on the storage I/O bus 210 and followed by the packet. The physical address contains enough information for the solid-state storage element 216, 218, 220 to direct the packet to the designated location within the page. Since all storage elements in a column of storage elements (e.g. SSS 0.0-SSS N.0 216a, 218a, 220a) are accessed simultaneously by the appropriate bus within the storage I/O bus 210a.a, to reach the proper page and to avoid writing the data packet to similarly addressed pages in the column of storage elements (SSS 0.0-SSS N.0 216a, 218a, 220a), the bank 214a that includes the solid-state storage element SSS 0.0 216a with the correct page where the data packet is to be written is simultaneously selected by the storage control bus 212.

Similarly, satisfying a read command on the storage I/O bus 210 requires a simultaneous signal on the storage control bus 212 to select a single bank 214a and the appropriate page within that bank 214a. In one embodiment, a read command reads an entire page, and because there are multiple solid-state storage elements 216a, 216b, 216m in parallel in a bank 214, an entire logical page is read with a read command. However, the read command may be broken into subcommands, as will be explained below with respect to bank interleave. A logical page may also be accessed in a write operation.

An erase block erase command may be sent out to erase an erase block over the storage I/O bus 210 with a particular erase block address to erase a particular erase block. Typically, an erase block erase command may be sent over the parallel paths of the storage I/O bus 210 to erase a logical erase block, each with a particular erase block address to erase a particular erase block. Simultaneously a particular bank (e.g. Bank 0 214a) is selected over the storage control bus 212 to prevent erasure of similarly addressed erase blocks in all of the banks (Banks 1-N 214b-n). Alternatively, no particular bank (e.g. Bank 0 214a) is selected over the storage control bus 212 to enable erasure of similarly addressed erase blocks in all of the banks (Banks 1-N 214b-n) simultaneously. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the solid-state storage media 110. For example, packets are streamed to the storage write buffers of a bank 214a of storage elements 216 and when the buffers are full, the packets are programmed to a designated logical page. Packets then refill the storage write buffers and, when full, the packets are written to the next logical page. The next logical page may be in the same bank 214a or another bank (e.g. 214b). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the solid-state storage media 110. When a copy is made, new copy of the requested data is created and a new entry is created in the index mapping the new copy of the requested data to the original packets. The new copy of the requested data is also written to the solid-state storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the solid-state storage media 110 and allows the solid-storage device controller 202 to monitor storage hot spots and level usage of the various logical pages in the solid-state storage media 110. Sequentially writing packets also facilitates a powerful, efficient garbage collection system, which is described in detail below. One of skill in the art will recognize other benefits of sequential storage of data packets.

Solid-State Storage Device Controller

In various embodiments, the solid-state storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the computer 112 or may be other devices.

Typically the solid-state storage controller(s) 104 communicate data to the solid-state storage media 110 over a storage I/O bus 210. In a typical embodiment where the solid-state storage is arranged in banks 214 and each bank 214 includes multiple storage elements 216a, 216b, 216m accessed in parallel, the storage I/O bus 210 is an array of busses, one for each column of storage elements 216, 218, 220 spanning the banks 214. As used herein, the term "storage I/O bus" may refer to one storage I/O bus 210 or an array of data independent busses 204. In one embodiment, each storage I/O bus 210 accessing a column of storage elements (e.g. 216a, 218a, 220a) may include a logical-to-physical mapping for storage divisions (e.g. erase blocks) accessed in a column of storage elements 216a, 218a, 220a. This mapping (or bad block remapping) allows a logical address mapped to a physical address of a storage division to be remapped to a different storage division if the first storage division fails, partially fails, is inaccessible, or has some other problem.

Data may also be communicated to the solid-state storage controller(s) 104 from a requesting device 155 through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage media 110 such as NAND flash or other storage media. In one embodiment, data and associated out-of-band metadata ("metadata") arriving with the data is communicated using one or more data channels comprising one or more solid-state storage controllers 104a-104n-1 and associated solid-state storage media 110a-110n-1 while at least one channel (solid-state storage controller 104n, solid-state storage media 110n) is dedicated to in-band metadata, such as index information and other metadata generated internally to the solid-state storage device 102.

The local bus 206 is typically a bidirectional bus or set of busses that allows for communication of data and commands between devices internal to the solid-state storage device controller 202 and between devices internal to the solid-state storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a computer 112 or other device in which the solid-state storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The solid-state storage device 102 may be packaged to fit internally to a device or as an externally connected device.

The solid-state storage device controller 202 includes a master controller 224 that controls higher-level functions within the solid-state storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/solid-state storage device controller 202 manages multiple data storage devices/solid-state storage media 110a-n, the master controller 224 divides the work load among internal controllers, such as the solid-state storage controllers 104a-n. For example, the master controller 224 may divide an object to be written to the data storage devices (e.g. solid-state storage media 110a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a computer 112 or other device connected to the storage device/solid-state storage device 102 views the storage device/solid-state storage device 102 as a block storage device and sends data to specific physical addresses in the storage device/solid-state storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in the computer 112, client 114, or other device wishing to use the storage device/solid-state storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a client 114 may have access to the computer network 116 through an I/O memory driver using a standard stack API and operating in conjunction with NICs 244.

In one embodiment, the master controller 224 is also a redundant array of independent drive ("RAID") controller. Where the data storage device/solid-state storage device 102 is networked with one or more other data storage devices/solid-state storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g. switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/solid-state storage device 102 may appear as a storage device connected through a SCSI bus, Internet SCSI ("iSCSI"), fiber channel, etc. Meanwhile the storage device/solid-state storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/solid-state storage device 102 to be partitioned into multiple virtual devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 202, or more specifically in a solid-state storage device 102.

In one embodiment, the solid-state storage device controller 202 includes a memory controller 228 which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the solid-state storage media 110n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/solid-state storage device 102 and one or more external memory controllers 250 and associated external memory arrays 252 and CPUs 248. Note that the external memory controllers 250 and external memory arrays 252 are called external because they are external to the storage device/solid-state storage device 102. In addition the DMA controller 226 may also control RDMA operations with requesting devices through a NIC 244 and associated RDMA controller 246.

In one embodiment, the solid-state storage device controller 202 includes a management controller 234 connected to a management bus 236. Typically the management controller 234 manages environmental metrics and status of the storage device/solid-state storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically the management bus 236 is connected to the various components within the storage device/solid-state storage device 102. The management controller 234 may communicate alerts, interrupts, etc. over the local bus 206 or may include a separate connection to a system bus 240 or other bus. In one embodiment the management bus 236 is an Inter-Integrated Circuit ("I2C") bus. One of skill in the art will recognize other related functions and uses of a management controller 234 connected to components of the storage device/solid-state storage device 102 by a management bus 236.

In one embodiment, the solid-state storage device controller 202 includes miscellaneous logic 242 that may be customized for a specific application. Typically where the solid-state device controller 202 or master controller 224 is/are configured using a FPGA or other configurable controller, custom logic may be included based on a particular application, customer requirement, storage requirement, etc.

Data Pipeline

FIG. 3 is a schematic block diagram illustrating one embodiment 300 of a solid-state storage controller 104 with a write data pipeline 106 and a read data pipeline 108 in a solid-state storage device 102 in accordance with the present invention. The embodiment 300 includes a data bus 204, a local bus 206, and buffer control 208, which are substantially similar to those described in relation to the solid-state storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a bias module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include an inverse bias module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below. In other embodiments, synchronous solid-state storage 110 may be used and synchronization buffers 308 328 may be eliminated.

Write Data Pipeline

The write data pipeline 106 includes a packetizer 302 that receives a data or metadata segment to be written to the solid-state storage, either directly or indirectly through another write data pipeline 106 stage, and creates one or more packets sized for the solid-state storage 110. The data or metadata segment is typically part of an object, but may also include an entire object. In another embodiment, the data segment is part of a block of data, but may also include an entire block of data. Typically, a set of data such as an object is received from a computer 112, client 114, or other computer or device and is transmitted to the solid-state storage device 102 in data segments streamed to the solid-state storage device 102 or computer 112. A data segment may also be known by another name, such as data parcel, but as referenced herein includes all or a portion of an object or data block.

Each object is stored as one or more packets. Each object may have one or more container packets. Each packet contains a header. The header may include a header type field. Type fields may include data, object attribute, metadata, data segment delimiters (multi-packet), object structures, object linkages, and the like. The header may also include information regarding the size of the packet, such as the number of bytes of data included in the packet. The length of the packet may be established by the packet type. The header may include information that establishes the relationship of the packet to the object. An example might be the use of an offset in a data packet header to identify the location of the data segment within the object. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the object to which the packet belongs. For example, the header may include an object identifier and offset that indicates the data segment, object, or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the object when reconstructing the data segment or object. The header may include a header type field. Type fields may include data, object attributes, metadata, data segment delimiters (multi-packet), object structures, object linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error correcting algorithm to generate ECC check bits which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended and output as an encoded block of length N+S. The value of N and S are dependent upon the characteristics of the algorithm which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the solid-state storage 110 to be extended. For example, if flash memory is used as the storage medium in the solid-state storage 110, the flash memory may be written approximately 100,000 times without error per erase cycle. This usage limit may be extended using a robust ECC algorithm. Having the ECC generator 304 and corresponding ECC correction module 322 onboard the solid-state storage device 102, the solid-state storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the solid-state storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the solid-state storage 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically when the write data pipeline 106 does not include an input buffer 306, a buffering function is performed elsewhere, such as in the solid-state storage device 102 but outside the write data pipeline 106, in the computer 112, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the solid-state storage 110. The write synch buffer 308 is located at a boundary between a local clock domain and a solid-state storage clock domain and provides buffering to account for the clock domain differences. In other embodiments, synchronous solid-state storage 110 may be used and synchronization buffers 308 328 may be eliminated.

In one embodiment, the write data pipeline 106 also includes a bias module 318 that receives the one or more packets from the packetizer 302, either directly or indirectly. The bias module 318 biases the bits of the data packets toward a bias of storage cells of the solid-state storage 110. As used herein, a "bias" is a preference, probability, or tendency of values for bits within a set of bits to exhibit a specific data pattern. A bias may be a natural property, a designed attribute, or a random occurrence. Data itself may have a bias, and data storage media may have a bias. A bias may be toward binary ones, toward binary zeroes, toward a balance of binary ones and zeroes, toward a certain binary value for certain bits, or the like.

For example, in one embodiment, end sections of data files may be padded with binary zeroes, causing the data packets that store the end sections to exhibit a bias toward binary zeroes, meaning that the data packets have more binary zeroes than binary ones. Other data packets may have more binary ones than zeroes, or a balance of binary ones and zeroes. While data packets may each have an individual bias based on data within the packets, a bias of the storage cells of the solid-state storage 110 may be based on some benefit associated with the storage of a particular binary value or pattern, or some property of the storage cells. One example of a storage cell property, NAND flash storage cells presently are biased to all binary one values or almost all binary one values when provided by a manufacturer. In addition, performing an erase operation on the NAND flash storage cells sets the binary values in each storage cell to a binary one, such that programming of the storage cells comprises changing certain storage cells to a binary zero value.

Each of the storage elements 216, 218, 220, in one embodiment, store binary data in a plurality of storage cells that exhibit a bias. Each storage cell stores one or more binary bits, or values. Flash memory storage cells may be single-level cells ("SLC") that each store a single binary bit, or multi-level cells ("MLC") that each store two or more binary bits. Examples of storage cells include transistors, capacitors, magnetic elements, mechanical elements, optical elements, and the like. In flash memory, each storage cell is typically a floating-gate transistor. NRAM, MRAM, DRAM, PRAM, and other types of solid-state storage may have other types of storage cells, and may store either a single binary bit or two or more binary bits per storage cell.

In one embodiment, the storage cells in the storage elements 216, 218, 220 in an empty or erased state store initial binary values. The initial binary values represent a bias for the storage cells. For example, the storage cells may have a physical, electrical, mechanical, or other quality that causes them to store a certain value by default. In another embodiment, the bias may be intentionally selected based on design considerations of the solid-state storage 110, on security considerations, on compatibility issues, or the like, and may not be based on a default property of the storage cells.

For example, in one embodiment, the storage cells of the storage elements 216, 218, 220 may each store a binary value of one upon delivery from a manufacturer, and may each be erased to a value of one prior to being programmed, or written to, as is typical with flash memory. In another embodiment, the storage cells of the storage elements 216, 218, 220 may be biased toward binary zeroes, toward a balance or equal amount of binary ones and zeroes, toward a certain binary value for a plurality of bits, or the like. The process of erasing a logical erase block in a bank 214 of the solid-state storage 110 is described in greater detail below with regard to FIG. 4.

The bias module 318 biases a packet by changing a bias of the packet to more closely match a bias of the storage cells of the solid state storage 110. The bias module 318 biases the packets in a reversible manner, such that the inverse bias module 332 can convert the packets back to their original data values with their original biases. In one embodiment, the packets that the bias module 318 biases are sized for storage in a specific logical or physical storage region or division of the solid-state storage 110, such as an erase block, a virtual erase block, a page, a virtual page, an ECC chunk, a division within a page, or the like. In one embodiment, the bias module 318 selectively biases certain packets based on a bias of the packets, and may not bias other packets. The bias module 318 is described in greater detail below with regard to U.S. Patent Application Ser. No. 61/305,496 filed 17 Feb. 2010, which is hereby incorporated by reference.

By biasing data packets toward the bias of the storage cells, the bias module 318 increases performance and endurance of the solid-state storage 110 and the solid-state storage device 102. For example, biasing packets to more closely match the bias of the storage cells decreases write times and erase times because fewer actual storage cells must be changed to execute the operation. It also increases the writable life of the storage cells because fewer operations that are executed on a storage cell mean that the storage cell will last longer before wear begins to affect the storage cell. In certain embodiments, biasing data packets may decrease power consumption or have other additional benefits. Because, in one embodiment, the storage cells store initial binary values that satisfy a bias just prior to being programmed or written to, the closer that the data packets match the bias of the storage cells, the fewer the number of storage cells that are changed to store the data packets, and the more storage cells that remain in a biased state.

As depicted, the bias module 318 biases the one or more packets prior to sending the packets to the ECC generator 304. Depending on the method that the bias module 318 uses to bias the packets, and on other design considerations, in a further embodiment, the bias module 318 may receive data subsequent to the ECC generator 304 in the write data pipeline 106, or be placed elsewhere in the write data pipeline 106. For example, in certain embodiments, it may be beneficial to keep ECC data separate from data that the bias module 318 biases, while in other embodiments it may be beneficial for the bias module 318 to bias data that includes ECC data from the ECC generator 304.

In another embodiment, the bias module 318 may be integrated with another element of the write data pipeline 106, such as the compression module 312, the encryption module 314, the ECC generator 304, or the like. The bias module 318 and corresponding inverse bias module 332 transparently increase the performance of the solid-state storage 110 as the bias module 318 biases data packets before they are written and the inverse bias module 332 converts the biased data packets back to their original state after they are read.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the solid-state storage device 102 but may vary on an object basis and received in conjunction with receiving data segments as described below. For example, an encryption key for a data segment to be encrypted by the encryption module 314 may be received with the data segment or may be received as part of a command to write an object to which the data segment belongs. The solid-state storage device 102 may use and store a non-secret cryptographic nonce in each object packet that is used in conjunction with the encryption key. A different nonce may be stored with every packet. Data segments may be split between multiple packets with unique nonces for the purpose of improving protection by the encryption algorithm.

The encryption key may be received from a client 114, a computer 112, key manager, or other device that holds the encryption key to be used to encrypt the data segment. In one embodiment, encryption keys are transferred to the solid-state storage controller 104 from one of a solid-state storage device 102, computer 112, client 114, or other external agent which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the solid-state storage device 102 allows object-by-object or segment-by-segment data encryption without a single file system or other external system to keep track of the different encryption keys used to store corresponding objects or data segments. Each requesting device 155 or related key manager independently manages encryption keys used to encrypt only the objects or data segments sent by the requesting device 155.

In one embodiment, the encryption module 314 may encrypt the one or more packets using an encryption key unique to the solid-state storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage 110. For example, where data is encrypted with media encryption unique to the specific solid-state storage device 102, if the solid-state storage 110 is connected to a different solid-state storage controller 104, solid-state storage device 102, or computer 112, the contents of the solid-state storage 110 typically could not be read without use of the same encryption key used during the write of the data to the solid-state storage 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the solid-state storage device 102 is beneficial so that clients 114 or other devices writing data to the solid-state storage device 102 may each specify a compression routine or so that one can specify a compression routine while another specifies no compression. Selection of compression routines may also be selected according to default settings on a per object type or object class basis. For example, a first object of a specific object may be able to override default compression routine settings and a second object of the same object class and object type may use the default compression routine and a third object of the same object class and object type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the solid-state storage device 102. This allows the solid-state storage device 102 to manage data so that data is systematically spread throughout the solid-state storage 110 to improve performance, data reliability and to avoid overuse and underuse of any one location or area of the solid-state storage 110 and to lengthen the useful life of the solid-state storage 110.

The garbage collector bypass 316 coordinates insertion of segments into the write data pipeline 106 with other segments being written by clients 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the virtual page in order to improve the efficiency of storage within the Solid-State Storage 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one virtual page in the solid-state storage 110. This allows a write operation to send an entire page of data to the solid-state storage 110 without interruption. By sizing the write buffer 320 of the write data pipeline 106 and buffers within the read data pipeline 108 to be the same capacity or larger than a storage write buffer within the solid-state storage 110, writing and reading data is more efficient since a single write command may be crafted to send a full virtual page of data to the solid-state storage 110 instead of multiple commands.

While the write buffer 320 is being filled, the solid-state storage 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiment with a write buffer 320 sized larger than a virtual page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a virtual page of data segments. One of skill in the art will recognize other write buffer 320 configurations that allow a virtual page of data to be stored prior to writing the data to the solid-state storage 110.

In another embodiment, the write buffer 320 is sized smaller than a virtual page so that less than a page of information could be written to a storage write buffer in the solid-state storage 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage 110 to fill the pages of a virtual page prior to programming the data. In this way a data stall in the write data pipeline 106 would not stall reading from the solid-state storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes an ECC correction module 322 that determines if a data error exists in ECC blocks a requested packet received from the solid-state storage 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the solid-state storage 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the object to which the packet belongs. In another embodiment, the solid-state storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required by the object index reconstruction module 272. Further examples include the transfer of packets of various types destined for use within the solid-state storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of an object in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the solid-state storage 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the solid-state storage controller 104 or to the requesting device 155.

The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes an inverse bias module 332 that receives one or more requested biased packets from the ECC correction module 322 and converts the one or more requested packets back to their original form by reversing the biasing process of the bias module 318 prior to sending the one or more requested packets to the depacketizer 324. In one embodiment, the inverse bias module 332 may use one or more indicators stored by the bias module 318 to convert the biased packets back to their original data.

In a further embodiment, the inverse bias module 332 converts the biased packets back to their original data without using an indicator. Instead of using an indicator, the inverse bias module 332 may implement an algorithm that is the inverse operation of the bias module 318. This algorithm may inverse the bias for each data packet received and/or a select number of data packets received. In the depicted embodiment, the inverse bias module 332 is located between the ECC correction module 322 and the depacketizer 324. In a further embodiment, the inverse bias module 332 may be located elsewhere in the read data pipeline 108, based on the location of the bias module 318 in the write data pipeline 106. The inverse bias module 332 is described in greater detail with regard to U.S. Patent Application Ser. No. 61/305,496 filed 17 Feb. 2010, which is hereby incorporated by reference.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a client 114, a computer 112, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per object type or object class basis. A first packet of a first object may be able to override a default decompression routine and a second packet of a second object of the same object class and object type may use the default decompression routine and a third packet of a third object of the same object class and object type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4:
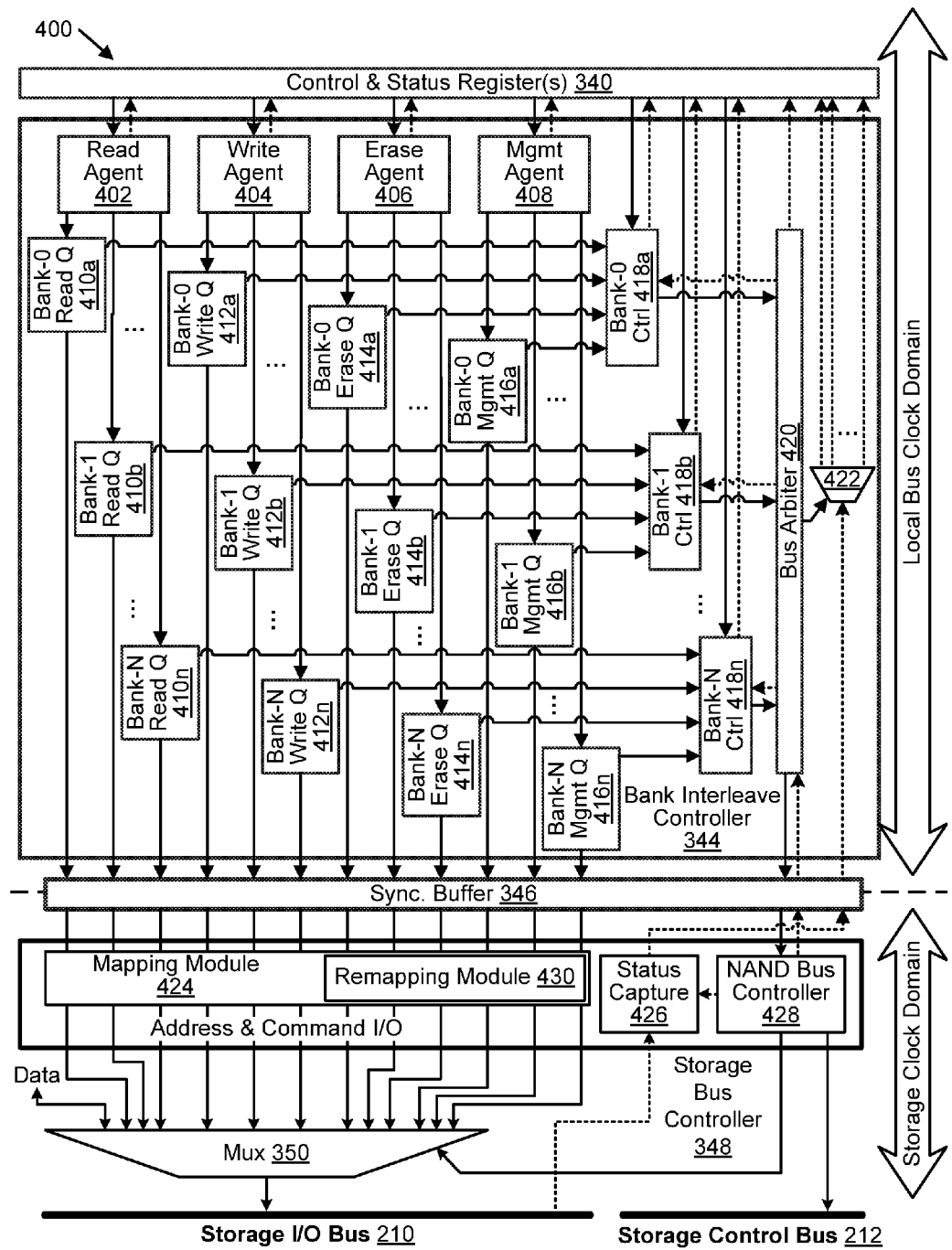
FIG. 4 is a schematic block diagram illustrating one embodiment of a bank interleave controller in the solid-state storage controller in accordance with the present invention.

The solid-state storage controller 104 and or solid-state storage device 102 may also include a bank interleave controller 344, a synchronization buffer 346, a storage bus controller 348, and a multiplexer ("MUX") 350, which are described in relation to FIG. 4.

Bank Interleave

FIG. 4 is a schematic block diagram illustrating one embodiment 400 of a bank interleave controller 344 in the solid-state storage controller 104 in accordance with the present invention. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the solid-state storage 110, bank controllers 418a-n, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 104 and coordinates among the banks 214 of the solid-state storage 110 execution of the commands stored in the queues, such that a command of a first type executes on one bank 214a while a command of a second type executes on a second bank 214b. The one or more commands are separated by command type into the queues. Each bank 214 of the solid-state storage 110 has a corresponding set of queues within the bank interleave controller 344 and each set of queues includes a queue for each command type.

The bank interleave controller 344 coordinates among the banks 214 of the solid-state storage 110 execution of the commands stored in the queues. For example, a command of a first type executes on one bank 214a while a command of a second type executes on a second bank 214b. Typically the command types and queue types include read and write commands and queues 410, 412, but may also include other commands and queues that are storage media specific. For example, in the embodiment depicted in FIG. 4, erase and management queues 414, 416 are included and would be appropriate for flash memory, NRAM, MRAM, DRAM, PRAM, etc.

For other types of solid-state storage 110, other types of commands and corresponding queues may be included without straying from the scope of the invention. The flexible nature of an FPGA solid-state storage controller 104 allows flexibility in storage media. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4, the bank interleave controller 344 includes, for each bank 214, a read queue 410 for reading data from the solid-state storage 110, a write queue 412 for write commands to the solid-state storage 110, an erase queue 414 for erasing an erase block in the solid-state storage, an a management queue 416 for management commands. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214b and directs the read command to the bank-1 read queue 410b. The write agent 404 may receive a write command to write data to a location in bank-0 214a of the solid-state storage 110 and will then send the write command to the bank-0 write queue 412a. Similarly, the erase agent 406 may receive an erase command to erase an erase block in bank-1 214b and will then pass the erase command to the bank-1 erase queue 414b. The management agent 408 typically receives management commands, status requests, and the like, such as a reset command or a request to read a configuration register of a bank 214, such as bank-0 214a. The management agent 408 sends the management command to the bank-0 management queue 416a.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

The bank controllers 418 typically receive commands from the queues 410, 412, 414, 416 and generate appropriate sub-commands. For example, the bank-0 write queue 412a may receive a command to write a page of data packets to bank-0 214a. The bank-0 controller 418a may receive the write command at an appropriate time and may generate one or more write subcommands for each data packet stored in the write buffer 320 to be written to the page in bank-0 214a. For example, bank-0 controller 418a may generate commands to validate the status of bank 0 214a and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. Additionally, in conjunction with example write command, the storage bus controller 348 will cause the one or more commands to multiplied to each of the each of the storage I/O buses 210a-n with the logical address of the command mapped to a first physical addresses for storage I/O bus 210a, and mapped to a second physical address for storage I/O bus 210b, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage 110 with an asynchronous, bi-directional serial storage I/O bus 210, only one command (control information) or set of data can be transmitted at a time. For example, when write commands or data are being transmitted to the solid-state storage 110 on the storage I/O bus 210, read commands, data being read, erase commands, management commands, or other status commands cannot be transmitted on the storage I/O bus 210. For example, when data is being read from the storage I/O bus 210, data cannot be written to the solid-state storage 110.

For example, during a write operation on bank-0 the bus arbiter 420 selects the bank-0 controller 418a which may have a write command or a series of write sub-commands on the top of its queue which cause the storage bus controller 348 to execute the following sequence. The bus arbiter 420 forwards the write command to the storage bus controller 348, which sets up a write command by selecting bank-0 214a through the storage control bus 212, sending a command to clear the input buffers of the solid-state storage elements 110 associated with the bank-0 214a, and sending a command to validate the status of the solid-state storage elements 216, 218, 220 associated with the bank-0 214a. The storage bus controller 348 then transmits a write subcommand on the storage I/O bus 210, which contains the physical addresses including the address of the logical erase block for each individual physical erase solid-stage storage element 216a-m as mapped from the logical erase block address. The storage bus controller 348 then muxes the write buffer 320 through the write sync buffer 308 to the storage I/O bus 210 through the MUX 350 and streams write data to the appropriate page. When the page is full, then storage bus controller 348 causes the solid-state storage elements 216a-m associated with the bank-0 214a to program the input buffer to the memory cells within the solid-state storage elements 216a-m. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214a, other subcommands of other commands are executing on other banks 214b-n. When one command is fully executed on a bank 214a, the bus arbiter 420 directs another command to the bank 214a. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage 110. An erase command may take 10 to 1000 times more time to execute than a write or a read command or 10 to 100 times more time to execute than a program command. For N banks 214, the bank interleave controller 344 may split the erase command into N commands, each to erase a virtual erase block of a bank 214a. While Bank 0 214a is executing an erase command, the bus arbiter 420 may select other commands for execution on the other banks 214b-n. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

In one embodiment, the solid-state controller 104 includes one bank interleave controller 344 that serves all of the storage elements 216, 218, 220 of the solid-state storage 110. In another embodiment, the solid-state controller 104 includes a bank interleave controller 344 for each set of storage elements 216a-m, 218a-m, 220a-m. For example, one bank interleave controller 344 serves one set of storage elements SSS 0.0-SSS N.0 216a, 218a, . . . 220a, a second bank interleave controller 344 serves a second set of storage elements SSS 1.0-SSS N.1 216b, 218b, . . . 220b, etc.

Storage-Specific Components

The solid-state storage controller 104 includes a synchronization buffer 346 that buffers commands and status messages sent and received from the solid-state storage 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the solid-state storage device 102 in order to optimize some aspect of design implementation.

The solid-state storage controller 104 includes a storage bus controller 348 that interprets and translates commands for data sent to and read from the solid-state storage 110 and status messages received from the solid-state storage 110 based on the type of solid-state storage 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350a-n where each multiplexer is dedicated to a set of solid-state storage elements either a row or a column in the solid-state storage array 110. For example, multiplexer 350a is associated with solid-state storage elements 216a, 218a, 220a. MUX 350 routes the data from the write data pipeline 106 and commands from the storage bus controller 348 to the solid-state storage 110 via the storage I/O bus 210 and routes data and status messages from the solid-state storage 110 via the storage I/O bus 210 to the read data pipeline 108 and the control and status registers 340 through the storage bus controller 348, synchronization buffer 346, and bank interleave controller 344.

In one embodiment, the solid-state storage controller 104 includes a MUX 350 for each column of solid-state storage elements (e.g. SSS 0.0 216a, SSS 1.0 218a, SSS N.0 220a). A MUX 350 combines data from the write data pipeline 106 and commands sent to the solid-state storage 110 via the storage I/O bus 210 and separates data to be processed by the read data pipeline 108 from commands. Packets stored in the write buffer 320 are directed on busses out of the write buffer 320 through a write synchronization buffer 308 for each column of solid-state storage elements (SSS 0.x to SSS N.x 216, 218, 220) to the MUX 350 for each column of solid-state storage elements (SSS 0.x to SSS N.x 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a solid-state storage 110 with an array of twenty storage elements (e.g. SSS 0.0 to SSS 0.M 216) per bank 214a may have a logical address for a particular erase block mapped to twenty physical addresses of the erase block, one physical address per storage element. Because the storage elements are accessed in parallel, erase blocks at the same position in each storage element in a column of storage elements 216a, 218a, 220a will share a physical address. To select one erase block (e.g. in storage element SSS 0.0 216a) instead of all erase blocks in the column (e.g. in storage elements SSS 0.0, 1.0, ... N.0 216a, 218a, 220a), one bank (in this case Bank 0 214a) is selected.

This logical-to-physical mapping for erase blocks is beneficial because if one erase block becomes damaged or inaccessible, the mapping can be changed to map to another erase block. This mitigates the loss of losing an entire virtual erase block when one element's erase block is faulty. The remapping module 430 changes a mapping of a logical address of an erase block to one or more physical addresses of a virtual erase block (spread over the array of storage elements). For example, virtual erase block 1 may be mapped to erase block 1 of storage element SSS 0.0 216a, to erase block 1 of storage element SSS 0.1 216b, ..., and to storage element 0.M 216m, virtual erase block 2 may be mapped to erase block 2 of storage element SSS 1.0 218a, to erase block 2 of storage element SSS 1.1 218b, ..., and to storage element 1.M 218m, etc. Alternatively, virtual erase block 1 may be mapped to one erase block from each storage element in an array such that virtual erase block 1 includes erase block 1 of storage element SSS 0.0 216a to erase block 1 of storage element SSS 0.1 216b to storage element 0.M 216m, and erase block 1 of storage element SSS 1.0 218a to erase block 1 of storage element SSS 1.1 218b, ..., and to storage element 1.M 218m, for each storage element in the array up to erase block 1 of storage element N.M 220m.

If erase block 1 of a storage element SSS0.0 216a is damaged, experiencing errors due to wear, etc., or cannot be used for some reason, the remapping module 430 could change the logical-to-physical mapping for the logical address that pointed to erase block 1 of virtual erase block 1. If a spare erase block (call it erase block 221) of storage element SSS 0.0 216a is available and currently not mapped, the remapping module 430 could change the mapping of virtual erase block 1 to point to erase block 221 of storage element SSS 0.0 216a, while continuing to point to erase block 1 of storage element SSS 0.1 216b, erase block 1 of storage element SSS 0.2 (not shown) ..., and to storage element 0.M 216m. The mapping module 424 or remapping module 430 could map erase blocks in a prescribed order (virtual erase block 1 to erase block 1 of the storage elements, virtual erase block 2 to erase block 2 of the storage elements, etc.) or may map erase blocks of the storage elements 216, 218, 220 in another order based on some other criteria.

In one embodiment, the erase blocks could be grouped by access time. Grouping by access time, meaning time to execute a command, such as programming (writing) data into pages of specific erase blocks, can level command completion so that a command executed across the erase blocks of a virtual erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the solid-state storage 110 and sends the status messages to the status MUX 422. In another embodiment, when the solid-state storage 110 is flash memory, the storage bus controller 348 includes a NAND bus controller 428. The NAND bus controller 428 directs commands from the read and write data pipelines 106, 108 to the correct location in the solid-state storage 110, coordinates timing of command execution based on characteristics of the flash memory, etc. If the solid-state storage 110 is another solid-state storage type, the NAND bus controller 428 would be replaced by a bus controller specific to the storage type. One of skill in the art will recognize other functions of a NAND bus controller 428.

Logical-to-Physical Translation and Deallocation

Figure 5:
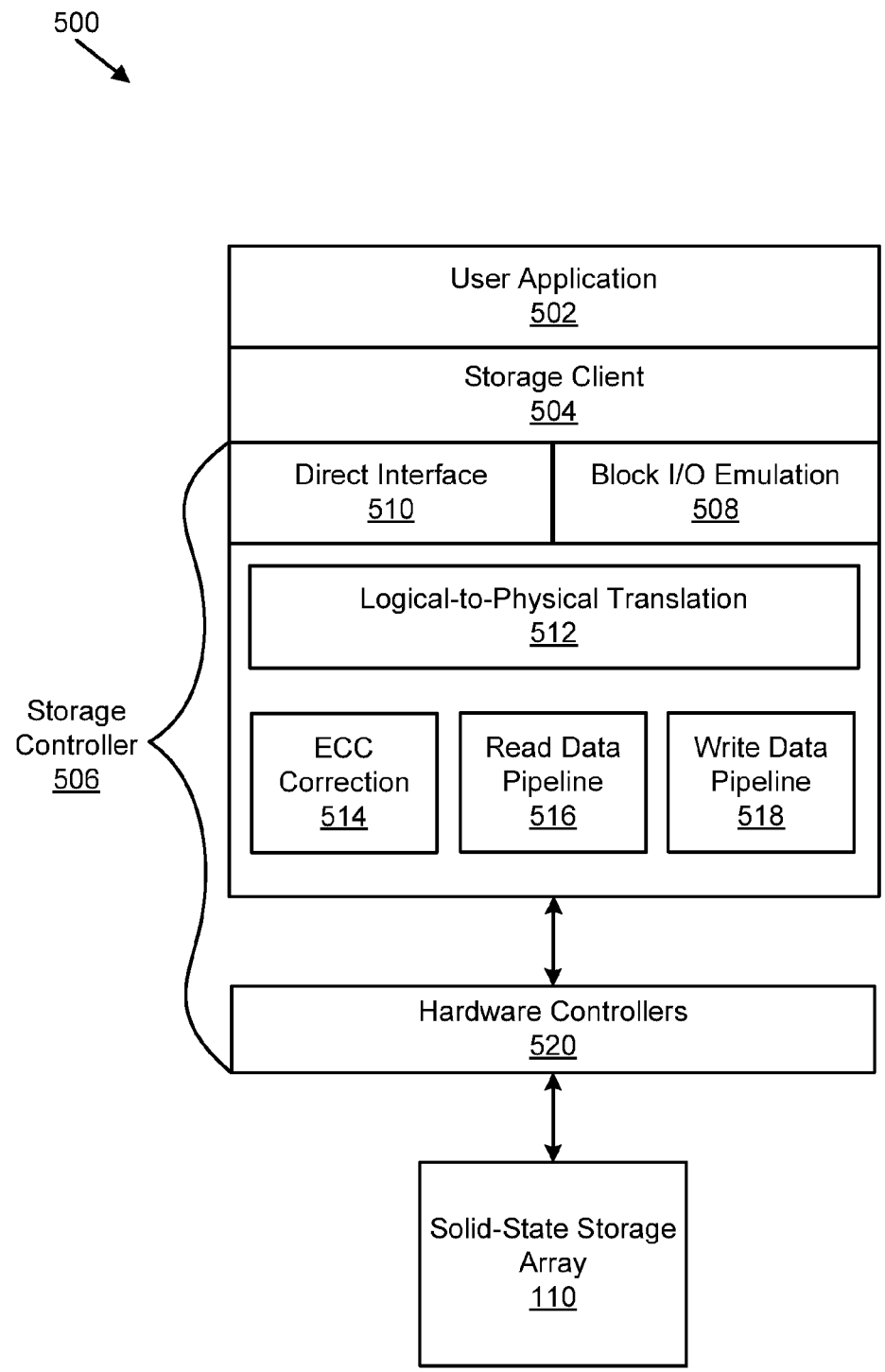
FIG. 5 is a schematic block diagram illustrating one embodiment of a logical representation of a solid-state storage controller with a logical-to-physical translation layer in accordance with the present invention.

FIG. 5 is a schematic block diagram illustrating a logical representation 500 of a solid-state storage controller 506 with a logical-to-physical translation layer 512 in accordance with the present invention. The storage controller 506 may be similar, in certain embodiments, to the solid-state storage controller 104 depicted in FIG. 1 and FIG. 2 and may include one or more solid-state storage controllers 104. The depicted embodiment shows a user application 502 in communication with a storage client 504. The storage client 504 is in communication with a storage controller 506 that includes the logical-to-physical translation layer 512, an ECC correction module 514, a read data pipeline 516, and a write data pipeline 518.

The storage controller 506 manages a solid-state storage array 110. The storage controller 506 may include various hardware and software controllers, drivers, and software, such as the depicted hardware controllers 520.

In one embodiment, the depicted hardware controllers 520 may be substantially similar to and include similar functionality as the solid-state controllers 104 and accompanying controllers and modules depicted in FIG. 2 and/or the bank interleave controller 344 and storage bus controller 348 depicted in FIG. 3. Furthermore, the ECC correction module 514 may be substantially similar and include similar functionality to the ECC correction module 322 and/or the ECC generator 304 depicted in FIG. 3. In addition, the read data pipeline 516 and the write data pipeline 518 may be substantially similar to the read data pipeline 108 and the write data pipeline 106 depicted in FIG. 1 and FIG. 3. The solid-state storage array 522 may include an array of solid-state storage banks similar to the solid-state storage media 110 and corresponding solid-state storage banks 214 depicted in FIG. 2.

In one embodiment, the user application 502 is a software application operating on or in conjunction with the storage client 504. The storage client 504 manages files and data and utilizes the functions and features of the storage controller 506 and associated solid-state storage array 522. Representative examples of storage clients include, but are not limited to, a server, a file system, an operating system, a database management system ("DBMS"), a volume manager, and the like. The storage client 504 is in communication with the storage controller 506. In one embodiment, the storage client 504 communicates through an Input/Output (I/O) interface represented by a block I/O emulation layer 508.

Certain conventional block storage devices divide the storage media into volumes or partitions. Each volume or partition may include a plurality of sectors. One or more sectors are organized into a logical block. In certain storage systems, such as those interfacing with the Windows® operating systems, the logical blocks are referred to as clusters. In other storage systems, such as those interfacing with UNIX, Linux, or similar operating systems, the logical blocks are referred to simply as blocks. A logical block or cluster represents a smallest physical amount of storage space on the storage media that is managed by the storage manager. A block storage device may associate n logical blocks available for user data storage across the storage media with a logical block address, numbered from 0 to n. In certain block storage devices, the logical block addresses may range from 0 to n per volume or partition. In conventional block storage devices, a logical block address maps directly to a particular logical block. In conventional block storage devices, each logical block maps to a particular set of physical sectors on the storage media.

However, certain storage devices 102 do not directly or necessarily associate logical block addresses with particular physical blocks. These storage devices 102 may emulate a conventional block storage interface to maintain compatibility with block storage clients 504.

When the storage client 504 communicates through the block I/O emulation layer 508, the storage device 102 appears to the storage client 504 as a conventional block storage device. In one embodiment, the storage controller 506 provides a block I/O emulation layer 508 which serves as a block device interface, or API. In this embodiment, the storage client 504 communicates with the storage device 102 through this block device interface. In one embodiment, the block I/O emulation layer 508 receives commands and logical block addresses from the storage client 504 in accordance with this block device interface. As a result, the block I/O emulation layer 508 provides the storage device 102 compatibility with block storage clients 504.

In one embodiment, a storage client 504 communicates with the storage controller 506 through a direct interface layer 510. In this embodiment, the storage device 102 directly exchanges information specific to non-volatile storage devices. A storage device 102 using direct interface 510 may store data on the solid-state storage media 110 as blocks, sectors, pages, logical blocks, logical pages, erase blocks, logical erase blocks, ECC chunks, logical ECC chunks, or in any other format or structure advantageous to the technical characteristics of the solid-state storage media 110. The storage controller 506 receives a logical address and a command from the storage client 504 and performs the corresponding operation in relation to the non-volatile solid-state storage media 110. The storage controller 506 may support a block I/O emulation layer 508, a direct interface 510, or both a block I/O emulation layer 508 and a direct interface 510.

As described above, certain storage devices, while appearing to a storage client 504 to be a block storage device, do not directly associate particular logical block addresses with particular physical blocks, also referred to in the art as sectors. Such storage devices may use a logical-to-physical translation layer 512. The logical-to-physical translation layer 512 provides a level of abstraction between the logical block addresses used by the storage client 504, and the physical block addresses at which the storage controller 506 stores the data. The logical-to-physical translation layer 512 maps logical block addresses to physical block addresses of data stored on solid-state storage media 110. This mapping allows data to be referenced in a logical address space using logical identifiers, such as a logical block address. A logical identifier does not indicate the physical location of data on the solid-state storage media 110, but is an abstract reference to the data.

The storage controller 506 manages the physical block addresses in the physical address space. In one example, contiguous logical block addresses may in fact be stored in non-contiguous physical block addresses as the logical-to-physical translation layer 512 determines the location on the solid-state storage media 110 to perform data operations.

Furthermore, in one embodiment, the logical address space is substantially larger than the physical address space. This "thinly provisioned" or "sparse address space" embodiment, allows the number of logical identifiers for data references to greatly exceed the number of possible physical addresses. Specifically, the logical address space may be "sparse" and, as such, may comprise a logical capacity that exceeds the physical storage capacity of the solid-state storage array 110. Accordingly, the logical address space may be defined independent of the solid-state storage array 110; the logical address space may present a larger address space than the physical storage capacity of the solid-state storage array 110, may present different storage location partitions and/or block sizes than provided by the solid-state storage array 110, and so on.

The storage controller 506 may support a sparse address space by writing data using a log-based, append only, cyclic writing structure. Specifically, the storage controller 506, in one embodiment, writes data of a write request to physical storage media of the solid-state storage array 110 at one or more logical addresses of the physical storage media corresponding to the addresses of the write request as mapped by the logical-to-physical translation layer 512. In a further embodiment, the storage controller 506 writes the data of the write request to the physical storage media by appending the data to a sequential, log-based writing structure of the physical storage media of the solid-state storage array 110 at an append point. The storage controller 506, in one embodiment, returns one or more physical addresses corresponding to the append point and the logical-to-physical translation layer 512 maps the one or more logical addresses to the one or more physical addresses corresponding to the append point.

As the storage controller 506 clears, trims, replaces, expires, and/or evicts, data from the physical addresses and associated physical storage media, the solid state storage media 110 in the depicted embodiment, are freed to store data for other logical addresses. In one embodiment, the storage controller 506 stores data at the physical addresses using a log-based, append only writing structure such that data overwritten by a subsequent write request invalidates other data in the log. Consequently, a garbage collection process recovers the physical capacity of the invalid data in the log. One embodiment of the log-based, append only writing structure is a logically ring-like data structure, as new data is appended to the log-based writing structure, previously used physical capacity is reused in a circular, theoretically infinite manner.

In one embodiment, the logical-to-physical translation layer 512 includes a map or index, a "forward map," that maps logical block addresses to physical block addresses. Often logical addresses used to identify stored data represent a very small number of logical addresses that are possible within a name space or range of possible logical addresses. Searching this sparsely populated space may be cumbersome. For this reason, the forward map is typically a data structure that facilitates quickly traversing the forward map to find a physical address based on a logical address. For example, the forward map may include a B-tree, a content addressable memory ("CAM"), a binary tree, a hash table, or other data structure that facilitates quickly searching a sparsely populated space or range. By using a forward map that quickly searches a sparsely populated logical namespace or address space, the logical-to-physical translation layer 512 provides an efficient way to determine one or more physical addresses from a logical address. In certain embodiments, the logical-to-physical translation layer 512 is a tree with nodes that represent logical block addresses and comprise corresponding physical block addresses.

In one embodiment, the forward map binds, in a logical-to-physical map, bound LBAs to physical storage locations. The storage controller 506 may determine if the logical space has sufficient unallocated logical space using the logical-to-physical map. The logical-to-physical map may be used to track allocation of bound LBAs, unbound LBAs, allocated LBAs, unallocated LBAs, allocated LBA capacity, unallocated LBA capacity, and the like. In one embodiment, the forward map binds LBAs to corresponding physical storage location addresses in multiple maps.

The forward map, the sparse logical address space, and the log-based writing are described in further detail in U.S. patent application Ser. No. 12/986,117 entitled "Apparatus, System, and Method for a Virtual Storage Layer" filed 6 Jan. 2011, for David Flynn et al., and U.S. Provisional Patent Application Ser. No. 61/373,271 entitled "Apparatus, System, and Method for Caching Data" filed 12 Aug. 2010, for David Flynn, which are hereby incorporated by reference.

As stated above, in conventional block storage devices, a logical block address maps directly to a particular physical block. When a storage client 504 communicating with the conventional block storage device deletes data for a particular logical block address, the storage client 504 may note that the particular logical block address is deleted and can re-use the physical block associated with that deleted logical block address without the need to perform any other action.

Conversely, when a storage client 504, communicating with a storage controller 104 with a logical-to-physical translation layer 512 (a storage controller 104 that does not map a logical block address directly to a particular physical block), deletes a logical block address, the corresponding physical block address remains allocated because the storage client 504 does not communicate the change in used blocks to the storage controller 506. The storage client 504 may not be configured to communicate changes in used blocks (also referred to herein as "data block usage information"). Because the storage client 504 uses the block I/O emulation 508 layer, the storage client 504 may erroneously believe that the storage controller 506 is a conventional storage controller that would not utilize the data block usage information. Or, in certain embodiments, other software layers between the storage client 504 and the storage controller 506 may fail to pass on data block usage information.

Consequently, the storage controller 104 preserves the relationship between the logical block address and a physical address and the data on the storage device 102 corresponding to the physical block. As the number of allocated blocks increases, the performance of the storage controller 104 may suffer depending on the configuration of the storage controller 104.

Specifically, in certain embodiments, the storage controller 506 is configured to store data sequentially, using an append-only writing process, and use a storage space recovery process that re-uses non-volatile storage media storing deallocated/unused logical blocks. Specifically, as described above, the storage controller 506 may sequentially write data on the solid-state storage media 110 in a log structured format and within one or more physical structures of the storage elements, the data is sequentially stored on the solid-state storage media 110.

As a result of storing data sequentially and using an append-only writing process, the storage controller 506 achieves a high write throughput and a high number of I/O operations per second ("IOPS"). The storage controller 506 includes a storage space recovery, or garbage collection process that re-uses data storage cells to provide sufficient storage capacity. The storage space recovery process reuses storage cells for logical blocks marked as deallocated, invalid, unused, or otherwise designated as available for storage space recovery in the logical-physical translation layer 512.

As described above, the storage space recovery process determines that a particular section of storage may be recovered. Once a section of storage has been marked for recovery, the storage controller 506 may relocate valid blocks in the section. The storage space recovery process, when relocating valid blocks, copies the packets and writes them to another location so that the particular section of storage may be reused as available storage space, typically after an erase operation on the particular section. The storage controller 506 may then use the available storage space to continue sequentially writing data in an append-only fashion. Consequently, the storage controller 104 expends resources and overhead in preserving data in valid blocks. Therefore, physical blocks corresponding to deleted logical blocks may be unnecessarily preserved by the storage controller 104, which expends unnecessary resources in relocating the physical blocks during storage space recovery.

Some storage devices 102 are configured to receive messages or commands notifying the storage device 102 of these unused logical blocks so that the storage device 102 may deallocate the corresponding physical blocks. As used herein, to deallocate a physical block includes marking the physical block as invalid, unused, or otherwise designating the physical block as available for storage space recovery, its contents on storage media no longer needing to be preserved by the storage controller 506. Data block usage information, in reference to the storage controller 506, may also refer to information maintained by the storage controller 506 regarding which physical blocks are allocated and/or deallocated/unallocated and changes in the allocation of physical blocks and/or logical-to-physical block mapping information. Data block usage information, in reference to the storage controller 506, may also refer to information maintained by the storage controller 506 regarding which blocks are in use and which blocks are not in use by a storage client. Use of a block may include storing of data in the block on behalf of the client, reserving the block for use by a client, and the like.

While physical blocks may be deallocated, in certain embodiments, the storage controller 506 may not immediately erase the data on the storage media. An erase operation may be performed later in time. In certain embodiments, the data in a deallocated physical block may be marked as unavailable by the storage controller 506 such that subsequent requests for data in the physical block return a null result or an empty set of data.

One example of a command or message for such deallocation is the "Trim" function of the "Data Set Management" command under the T13 technical committee command set specification maintained by INCITS. A storage device, upon receiving a Trim command, may deallocate physical blocks for logical blocks whose data is no longer needed by the storage client 504. A storage controller 506 that deallocates physical blocks may achieve better performance and increased storage space, especially storage controllers 506 that write data using certain processes and/or use a similar data storage recovery process as that described above.

Consequently, the performance of the storage controller 506 is enhanced as physical blocks are deallocated when they are no longer needed such as through the Trim command or other similar deallocation commands issued to the storage controller 506.

Virtual Memory Management

Figure 6:
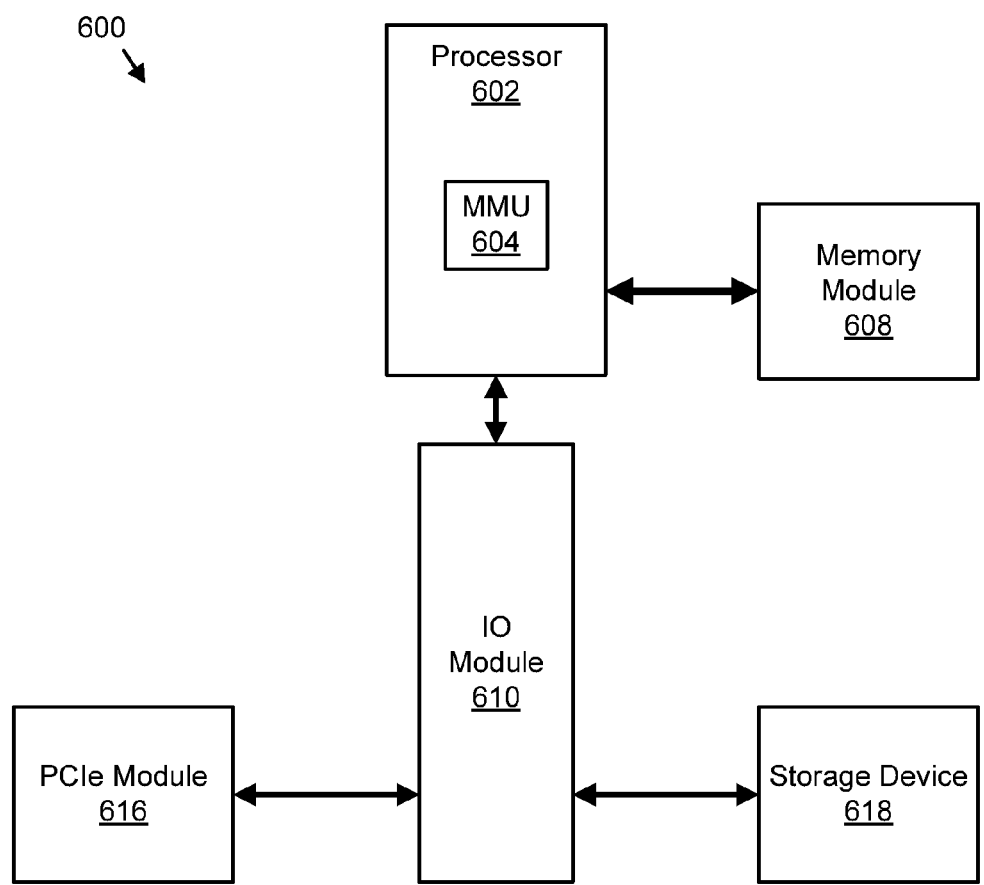
FIG. 6 is a schematic block diagram illustrating one embodiment of a computing device in accordance with the present invention.

FIG. 6 illustrates one embodiment of a computing device 600 in accordance with the present invention. The computing device 600 may be one embodiment of the computer 112 depicted in FIG. 1. The computing device 600 includes a processor 602, a memory module 608, an IO module 610, a peripheral component interconnect express ("PCIe") module 616, and a storage device 618. One of skill in the art will recognize that other configurations of a computing device 600 may be employed with the embodiments described herein.

The processor 602 executes computer readable programs stored on the memory module 604 as is well known to those skilled in the art. The processor 602 may include a cache 603 to reduce the average time to access the memory module 608. In one embodiment, the processor 602 comprises a multiprocessor having one or more cores (independent processing units). The processor 602 may include a memory management unit ("MMU") 604 that translates virtual memory addresses from a client (such as an operating system and/or application) to physical memory addresses that, in conventional computing devices, may correspond to physical locations on the storage media of the memory module 608. For example, in conventional computing devices, an operating system may send a memory read request, memory write request or other type of system memory access to the processor 602 that includes virtual memory addresses for a page stored in the memory module 608. The MMU 604 may translate the virtual memory addresses to physical memory addresses corresponding to locations of page data on the memory module 608. As used herein, a system memory access is a command and/or request to read data, write date, and/or the like to/from main memory. A system memory access may originate from an application attempting to read or write data to a page in main memory.

The processor 602 may communicate with the IO module 610. The IO module 610 may support and communicate with the PCIe module 616, the storage device 618, and other components as is known in the art. Computer readable programs may be stored in non-volatile storage on the storage device 618. The storage device 618 may include a hard disk drive, an optical storage device, a holographic storage device, a micromechanical storage device, a solid-state storage device 102 described above in relation to FIGS. 1-5, and the like. A solid-state storage device 102 such as that described above, may also communicate with the IO module 610 through the PCIe module 616 using a PCIe bus.

In conventional computing devices, the memory module 608, or "main memory," includes volatile memory such as dynamic random access memory ("DRAM") and static random access memory ("SRAM"). Specifically, the memory module 608 may include one or more storage media, such as one or more dual in-line memory modules ("DIMM"s) of volatile memory. Each DIMM may comprise a series of volatile memory integrated circuits.

Figure 7:
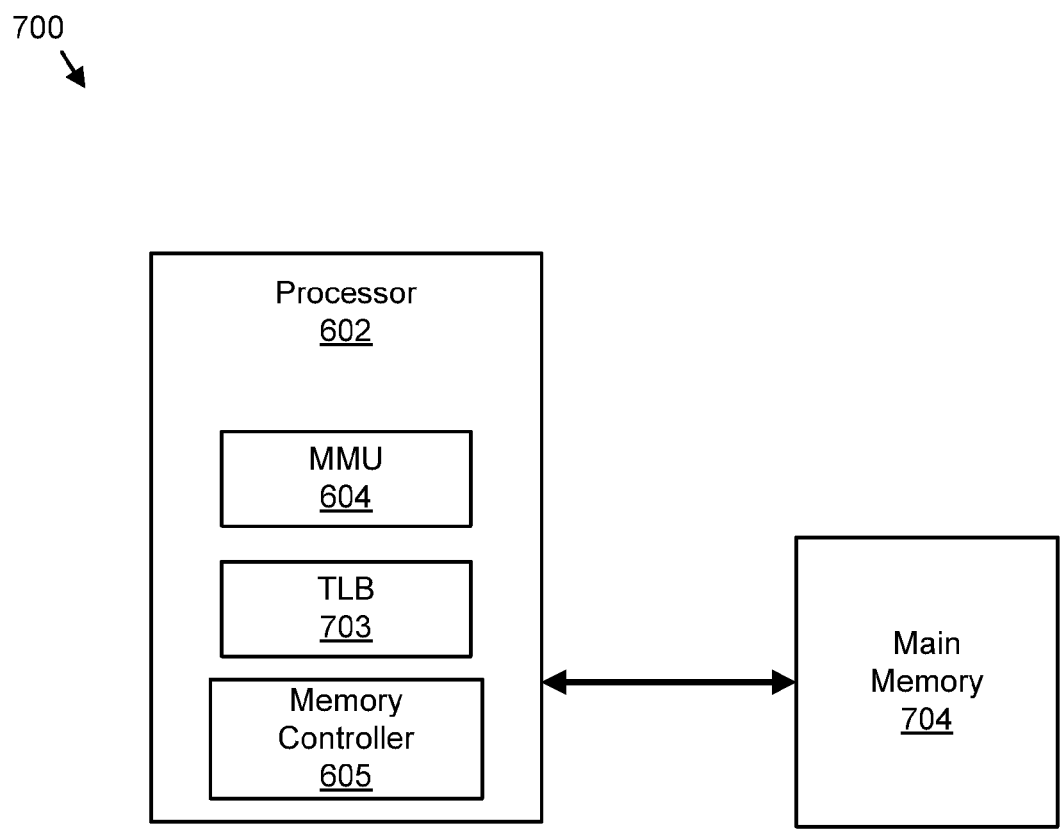
FIG. 7 is a schematic block diagram illustrating one embodiment of a processor in communication with main memory accordance with the present invention.

FIG. 7 illustrates one embodiment of a system 700 with a processor 602 in communication with main memory 704 in accordance with the present invention. FIG. 7 refers to elements of FIG. 6, like numbers referring to like elements. The processor includes an MMU 604, a translation lookaside buffer ("TLB") and a memory controller 605. The main memory 704 may be similar to the memory module 608 of FIG. 6.

As described above, the processor 602 may be a multiprocessor having one or more cores. As described above, the processor 602 may include an MMU 604 that translates virtual memory addresses from a client to physical memory addresses that, in conventional computing devices, may correspond to physical locations on one or more of the media of main memory. The physical memory addresses from the MMU 604 may be communicated to the main memory 704 by the memory controller 605, which is described below.

The memory controller 605 communicates with, is coupled to, and/or integrated with the processor 602. The memory controller 605 manages data communication between the processor 602 and the main memory 704. In one embodiment, the memory controller 605 communicates system memory accesses to the main memory 704. System memory accesses may include, but are not limited to data read requests, data write requests, and the like. In addition, a data operation command, in one embodiment, contains a physical memory address from the MMU. For example, the memory controller 605 may send a 64-bit memory address in a system memory access to request a word of data from the main memory 704.

The MMU 604 may translate virtual memory addresses to physical memory addresses through the TLB 703. The TLB 703 may improve address translation speed by caching logical-to-physical mappings. In one embodiment, the TLB 703 stores entries for data pages (e.g. 4 KB pages). A data page is a unit of main memory used for virtual memory addressing. A page may comprise the smallest unit of data for memory allocation performed by the operating system for swapping application data between main memory and persistent storage (e.g. secondary storage such as a hard disk drive, solid-state storage drive, pcie storage device, and/or the like). If a virtual memory address requested by the MMU 604 is present in the TLB 703, called a TLB hit, the TLB entry can be used to access memory. If the virtual memory address requested by the MMU 604 is not in the TLB 703, called a TLB miss, the virtual memory address, and its associated physical memory address is referenced in the page table, retrieved, and copied to the TLB 703. If the page table entry for the virtual memory address is either not located in the page table or indicated in the page table as having been swapped to persistent storage 810 (e.g. the page is indicated as "active but not present"), the MMU 604 may trigger a "page fault."

Figure 8:
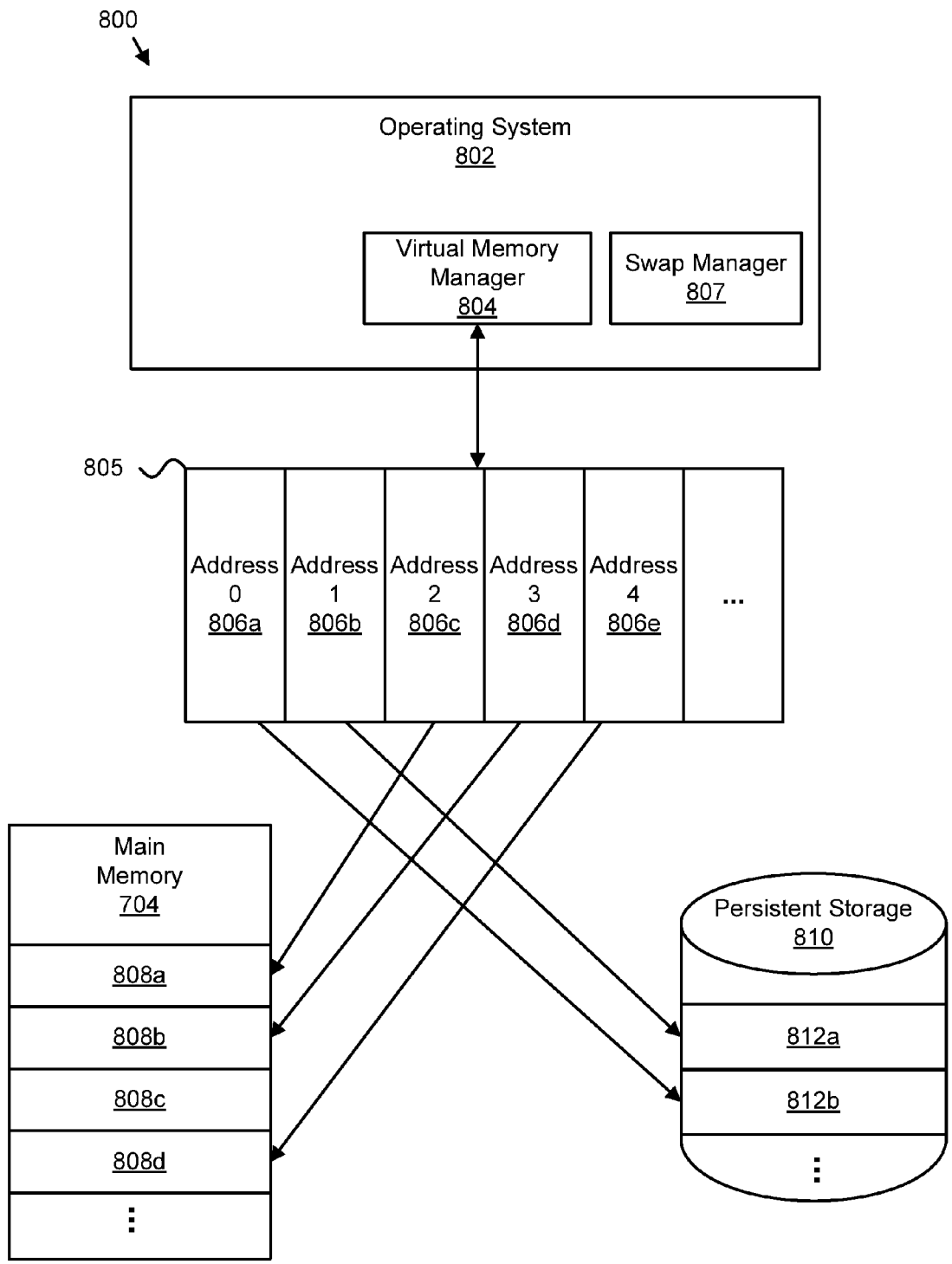
FIG. 8 is a schematic block diagram illustrating one embodiment of a virtual memory mapping in accordance with the present invention.

Referring also to FIG. 8, an operating system 802 may include a virtual memory manager 804 and a swap manager 807 configured to manage memory of the computer system. Specifically, the virtual memory manager 804 may reference entries in the page table for virtual memory addresses and the swap manager 807 may perform swapping (also referred to as paging) to store and retrieve data from persistent storage 810, such as a hard disk, solid-state storage device discussed above, and the like, for use in main memory 704. Specifically, the swap manager 807 may store pages of data from main memory 704 to persistent storage 810 to free up more room on main memory 704.

When the processor 602 attempts to access swapped pages using a system memory access as described above (pages not in main memory 704, this results in a page fault), such as, for example, in response to a request from an application, a page fault is triggered and the swap manager 807 locates the pages in persistent storage 810. To locate the data pages in persistent storage 810, the swap manager 807 performs a lookup of the page in a swap table or other index that maps a page identifier to a physical location (e.g. the sector) on the persistent storage 810 where the page is located. After locating the page, the swap manager 807 loads the page into main memory 704, and updates the page table entry for the page with the physical memory address for the page on main memory 704 for the virtual memory manager 804 to reference. The operating system 802 may then return control to the program to retry the memory access. Therefore, pages represented by addresses 806a-e in a virtual address space 805 may be loaded 808a-d in main memory 704 or may have been swapped and stored 812a-b on persistent storage 810.

An operating system 802 may trigger a "segmentation fault" for a program attempting to access data pages in main memory using virtual memory addresses that are outside of the virtual memory address range or that are part of a protected set of virtual memory addresses. A conventional application may crash and/or abandon a memory access request in response to receiving a segmentation fault.

Application Direct Virtual Memory Management

Figure 9:
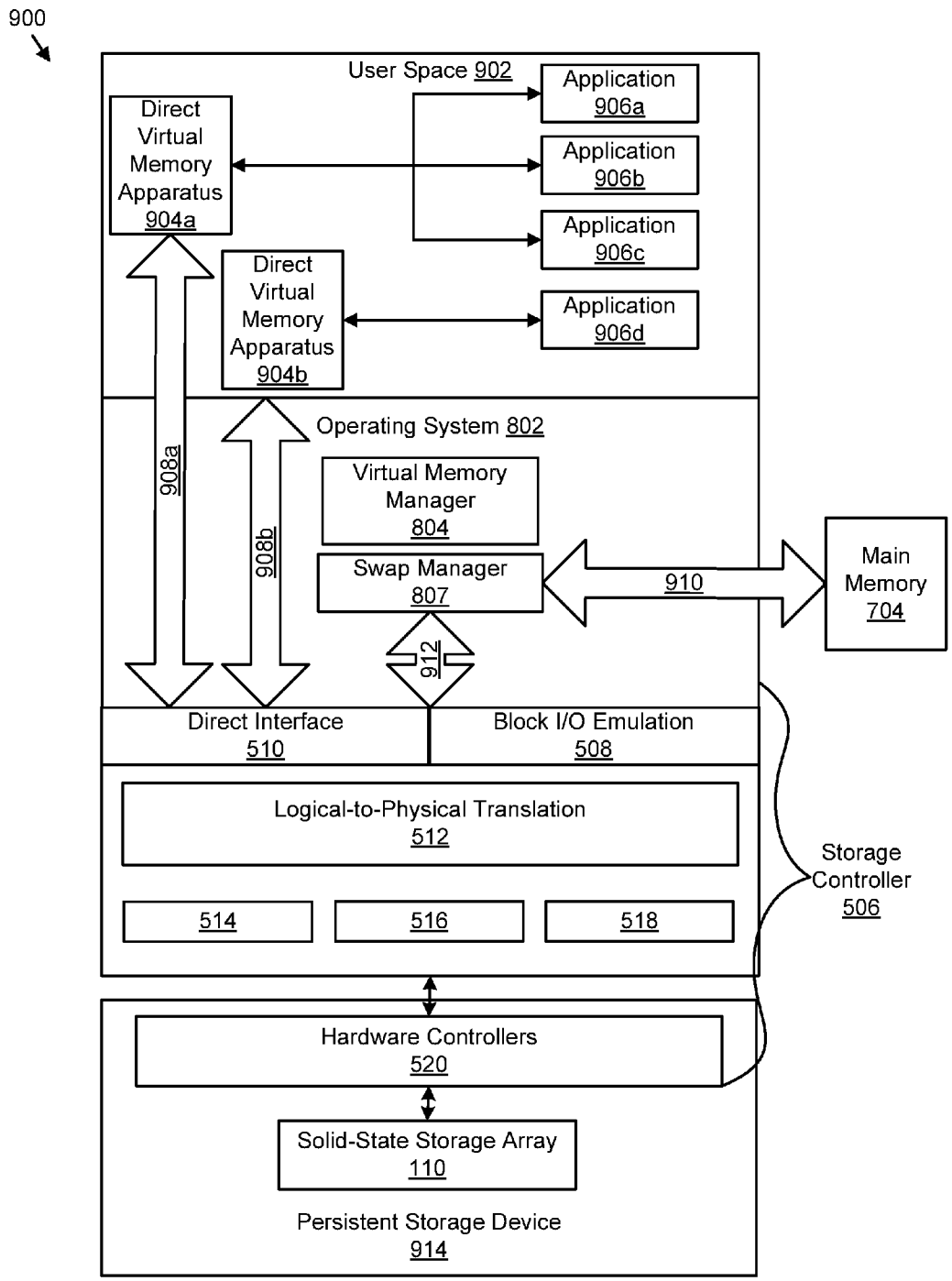
FIG. 9 is a schematic block diagram illustrating one embodiment of a computing system for application direct virtual memory management in accordance with the present invention.

FIG. 9 is a schematic block diagram illustrating one embodiment of a computing system 900 for application direct virtual memory management in accordance with the present invention. FIG. 9 refers to elements of FIGS. 5-8, like numbers referring to like elements. The computing system 900 includes user space 902 and an operating system 802 (also known as kernel space). The computing system 900 also includes a storage controller 506 and a persistent storage device 914 that includes a solid-state storage array 110 in the depicted embodiment, although any suitable storage media may be used). In one embodiment, the persistent storage device 914 comprises the storage controller 506, embodied as least in part by a device driver and solid-state storage array 110 in FIG. 5. Furthermore, the user space includes one or more direct virtual memory apparatuses 904a-b and a plurality of applications 906a-d executing in the user space 902, each with access to the direct virtual memory apparatus 904. In addition, the operating system 802, virtual memory manager 804, and swap manager 807 may be similar to the operating system 802, virtual memory manager 804, and swap manager 807 in FIG. 8. The virtual memory manager 804 may manage virtual memory and the swap manager 807 may swap pages between the main memory 704 and persistent storage (e.g. the solid-state storage array 110 through the storage controller 506 including the logical-to-physical translation layer 512). The computing system 900 may include one or more instances of the direct virtual memory apparatus 904. Furthermore, as depicted, applications 906 may share an instance of the direct virtual memory apparatus 904 in a many-to-one relationship or a single application may communicate with a single direct virtual memory apparatus 904 in a one-to-one relationship.

In addition to, or instead of, the virtual memory swapping performed by the swap manager 807, the direct virtual memory apparatus 904, applications 906, and/or storage controller 506 may implement application direct virtual memory management. Specifically, the storage controller 506, in one embodiment, may expose at least a portion of its logical-to-physical translation layer 512 as a sparse virtual address space to support virtual memory swapping. This swapping may be independent of virtual memory swapping performed by the swap manager 807 and may be mutually exclusive to memory swapping performed by the swap manager 807. Specifically, the direct virtual memory apparatus 904, in certain embodiments, performs virtual memory swapping in addition to, or in place of, the virtual memory swapping of the swap manager 807. Furthermore, the direct virtual memory apparatus 904 may perform application-specific virtual memory swapping. This application direct virtual memory management may provide applications with greater control in virtual memory management, allowing for application specific memory management, memory management optimized for a specific storage media, application type, and the like.

Furthermore, the direct virtual memory apparatus 904 may swap data pages from main memory 704 in, and out of, the persistent storage device 914, referencing the data pages defined within the exposed sparse virtual address space of the logical to physical translation layer 512. The storage controller 506 provides and manages an index as part of the logical-to-physical translation layer 512, which maps logical (virtual) addresses to physical storage locations on persistent storage 110. Therefore, the direct virtual memory apparatus 904 does not have to determine a physical location on the persistent storage device 914 to store or retrieve data pages as this overhead is already performed by the storage controller 506. The direct virtual memory apparatus 904 may determine a swap address, or a virtual address in the exposed sparse virtual address space, for a particular data page, and initiate a read or write operation for a data page using the swap address without having to perform the physical address lookup itself. In contrast, as described above, the swap manager 807 locates physical locations for data pages on the persistent storage device 914 by performing a lookup operation in a swap table. By using an exposed sparse virtual address space, the direct virtual memory apparatus 904 saves overhead and time by not performing the physical location lookup. For example, in one embodiment, as described below, the exposed sparse virtual address space may directly map swap addresses to the virtual memory addresses of pages for applications. In one embodiment, also described below, the direct virtual memory apparatus 904 maps virtual memory addresses to swap addresses using a hash function.

The direct virtual memory apparatus 904 may comprise an object, application, process, thread, service, user space library, or the like executing in user space 902. In addition, all or a portion of the direct virtual memory apparatus 904 may reside in one or more of the applications 906, in kernel space, in the operating system 802, and/or the storage controller 506.

In one embodiment, the logical-to-physical translation layer 512 provides a direct interface 510 to a virtual address space that is accessible by objects and/or applications 906 in user space 902. As stated above, the virtual address space may be substantially larger than the physical address space in a "thinly provisioned" or "sparse address space" embodiment, allowing the number of logical identifiers for data references to greatly exceed the number of possible physical addresses. Therefore, in one embodiment, the exposed sparse virtual address space may be a sparse address space supported with log-based, append only writing and garbage collection as described above.

Specifically, the storage controller 506, in one embodiment, maintains an index of associations between logical memory addresses of data and physical locations comprising the data on the media of the persistent storage device 914. In one embodiment, the storage controller 506 maps logical memory addresses to actual physical addresses and/or locations on the memory media using the index. In a further embodiment, the storage controller 506 uses a single mapping structure as the index to map logical memory addresses to physical addresses specifying actual locations on the memory media.

The index, in various embodiments, may include a B-tree, B*-tree, B+-tree, a CAM, a binary tree, a hash table, an index, an array, a linked-list, a look-up table, or another mapping data structure. Use of a B-tree as the index in certain embodiments, is particularly advantageous where the logical address space presented is a very large address space (2^64 addressable blocks—which may or may not be sparsely populated). Because B-trees maintain an ordered structure, searching such a large space remains very fast. For example, in one embodiment, the index includes a B-tree with multiple nodes and each node may store several entries. In the example embodiment, each entry may map a variable sized range or ranges of logical memory addresses to a location on the memory media. Furthermore, the number of nodes in the B-tree may vary as the B-tree grows wider and/or deeper.

In one embodiment, the index only includes a node or entry for logical memory addresses that are associated with currently stored data in the memory media. In this embodiment, membership in the index represents membership in/presence on the memory media. The storage controller 506, in one embodiment, adds entries, nodes, and the like to the index as data is stored on the memory media and removes entries, nodes, and the like from the index in response to data being cleared, trimmed, or otherwise deallocated from physical media. Similarly, membership in the index may represent valid allocated memory units (such as data pages) on the memory media. The storage controller 506, in one embodiment, adds entries, nodes, and the like to the index as data is stored on the memory media and removes entries, nodes, and the like from the index in response to data being invalidated cleared, trimmed, or otherwise removed from the memory media.

In addition, the storage controller 506 may be configured, initially or on demand, to present a different size virtual address space as determined by a configuration setting, a particular host architecture, a particular operating system 802, or the like to correspond with various sized virtual address spaces 805 for various applications 906a-d. For example, on one host computer with a particular operating system 802 that provides each application 906a-d with a 32-bit virtual address space 805, the storage controller 506 may present the exposed sparse virtual address space as a 32-bit logical address space. On a different host computer and/or operating system 802, the storage controller 506 may present a 48-bit, 60-bit, or 64-bit virtual address space to correspond with a 48-bit, 60-bit, or 64-bit virtual address space 805 that the host computer/operating system 802 provides for each application 906a-d.

In the depicted embodiment, the direct virtual memory apparatus 904 communicates directly 908 with logical-to-physical translation layer 512 through the direct interface 510 to access the exposed sparse virtual address space. Furthermore, the direct interface 510 may provide an Application Programming Interface ("API") and or other protocols to access and to perform memory operations in the logical-to-physical translation layer 512.

Figure 10:
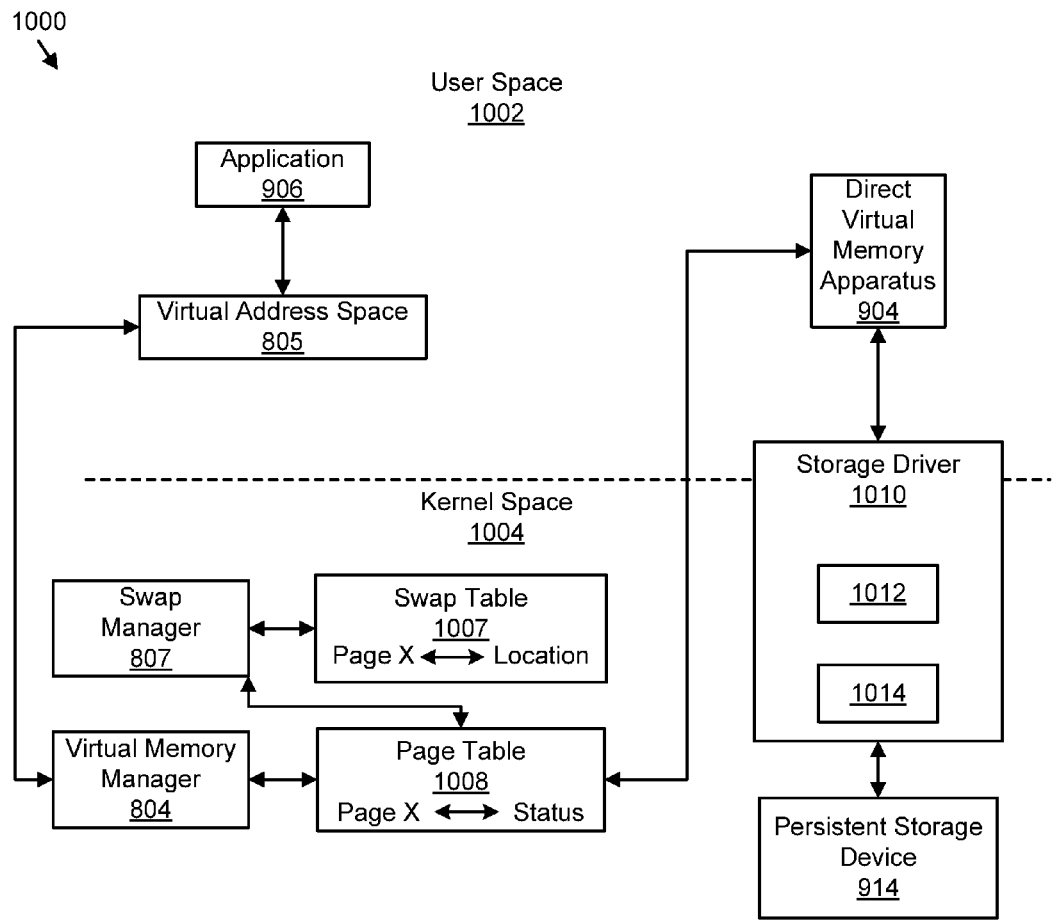
FIG. 10 is a schematic block diagram illustrating one embodiment of a system for application direct virtual memory management in accordance with the present invention.

FIG. 10 depicts one embodiment of a system 1000 for application direct virtual memory management in which the direct virtual memory apparatus 904 performs virtual memory swapping in addition to virtual memory swapping performed by the swap manager 807. The system 1000 includes, in user space 1002, at least one application 906 with a virtual address space 805 and a direct memory apparatus 904 and, in kernel space 1004, a virtual memory manager 804, and a persistent storage device 914, which may be substantially similar to the like numbered elements described above. In addition, the system 1000 includes a swap manager 807, a swap table 1007, a page table 1008, and a storage driver 1010. The storage driver 1010 may be one embodiment of at least a software portion of the storage controller 506 and includes an index 1012 and exposed sparse virtual address space 1014 as described above. Furthermore, the persistent storage device 914 may comprise, but is not limited to, a hard disk drive, memory modules, memory media, storage media, one or more storage devices, a solid-state storage device 102 as described above in relation to at least FIG. 1, and/or the like. In embodiments with multiple applications 906, each application 906 includes its own virtual address space 805.

As described above, the page table 1008 includes entries for data pages. Each entry may include a page identifier (e.g. a virtual memory address in the virtual address space where the page begins, with pages having a fixed size) and a status for the page indicating whether the page is loaded in main memory or is swapped out to the persistent storage device 914. In one embodiment, the page table 1008 may not have an entry for a particular data page because the page does not exist (and any calls to such page result in a segfault), is protected, or is swapped out of main memory. The swap table 1007 includes entries for swapped data pages with a page identifier such as the virtual memory address and a location identifier indicating a physical location on the persistent storage device 914 where a swapped page resides. As described above, if the page table entry for a virtual memory address is indicated in the page table 1008 as having been swapped to the persistent storage device 914, the MMU 604 may trigger a page fault triggering the swap manager 807 to look up the page in the swap table 1007, locate the physical location on memory media of the persistent storage device 914, and move the page back into main memory.

In one embodiment, the direct virtual memory apparatus 904 handles virtual memory swapping for a particular range of virtual memory addresses while the swap manager 807 handles virtual memory swapping for other virtual memory addresses of the application 906. In one embodiment, the direct virtual memory apparatus 904 performs virtual memory swapping for one application 906 exclusive of the swap manager 807, meaning that the direct virtual memory apparatus handles all swapping for one or more applications 906. In the same embodiment, the direct virtual memory apparatus 904 performs virtual memory swapping for application 906 while the swap manager performs virtual memory swapping for other applications (not illustrated). In other words, the direct virtual memory apparatus 904, depending on the embodiment, may handle all of virtual memory swapping for one or more applications 906 and share the main memory with the swap manager that is managing swapping for other applications.

Alternatively, or in addition, the direct virtual memory apparatus 904, depending on the embodiment, may handle virtual memory swapping for a single applications 906 for a specific range of virtual memory addresses but share swapping with the swap manager 807 for other virtual memory addresses of the application 906. In this manner, the persistent storage device 914 can be used as memory swap capacity to augment the virtual memory management performed by the swap manager 807. In one embodiment, the direct virtual memory apparatus handles swapping transparent to the application, meaning the application is not aware and/or does not request the direct virtual memory apparatus to handle swapping. For example, once installed the direct virtual memory apparatus may cooperate with the swap manager 807 to swap memory pages for a predetermined set of memory pages (i.e. the upper address range pages or lower address range pages)

In one embodiment, the application explicitly requests pages to be handled by the direct virtual memory apparatus 904. Specifically, in an embodiment in which the direct virtual memory apparatus 904 performs virtual memory swapping in addition to that of the swap manager 807, an application 906 may explicitly designate pages for which swapping is to be handled by the direct virtual memory apparatus 904 using an extension of an existing API for a memory allocation command ("malloc"). In one embodiment, for data pages allocated using this extended malloc command, the direct virtual memory apparatus 904 allocates pages from main memory 704 for the application and sets a protection bit in the page table 1008 upon allocation to indicate to the swap manager 807 that the pages are not to be swapped. The direct virtual memory apparatus 904 then performs swapping for these pages. In such an embodiment, the direct virtual memory apparatus 904 uses a segfault as a signal to return swapped pages to main memory 704. In other words, the direct virtual memory apparatus 904 traps a segment fault (segfault) and swaps a referenced page in from the persistent storage device 914. The direct virtual memory apparatus 904 configures the swap manager 807 and virtual memory manager 804 to signal a segfault when a system access is attempted on the referenced page.

Specifically, as pages managed by the direct virtual memory apparatus 904 are moved from main memory 704 during swapping, the direct virtual memory apparatus 904 marks the pages as unavailable or protected (e.g. protected by issuing an "mprotect" for a memory range that includes the pages). This protection mechanism signals to the virtual memory manager 804 and swap manage 807 that the protected page is not swappable and any system access calls to addresses in the protected page are to be directed to the direct virtual memory apparatus 904. The address range for these pages may stay protected and marked as unavailable for as long as the corresponding pages are swapped out onto the persistent storage device 914.

As a result, when an application 906 attempts to use a system memory access to access an unavailable page (e.g. an address in the range protected by the "mprotect"), the operating system 802 causes a segfault in response to the attempt. As described below, the direct virtual memory apparatus 904 may use this segfault as a cue or trigger to swap pages. In one embodiment, an application 906 may allocate memory with the extended malloc command recognizing that the direct virtual memory apparatus 904 will handle memory references within that allocated memory and swap pages in and out as needed in response to the segfaults such reference will create. After the direct virtual memory apparatus 904 moves a page back into main memory 704 from the persistent storage device 914, the direct virtual memory apparatus 904, in one embodiment, updates the page table 1008 to indicate that the page is present in main memory 704.

In an embodiment in which swapping performed by the direct virtual memory apparatus 904 is handled invisibly to the application 906, the direct virtual memory apparatus 904 may not require pages to have been allocated by special memory allocation commands before handling swapping for those pages. The direct virtual memory apparatus 904 may select a certain address range (e.g. the virtual memory addresses associated with the first n pages or last n pages of the virtual memory space, or the like) of pages for an application 906 and protect them in the virtual address space by setting a bit in the page table as described above without awareness of the application 906.

Figure 11:
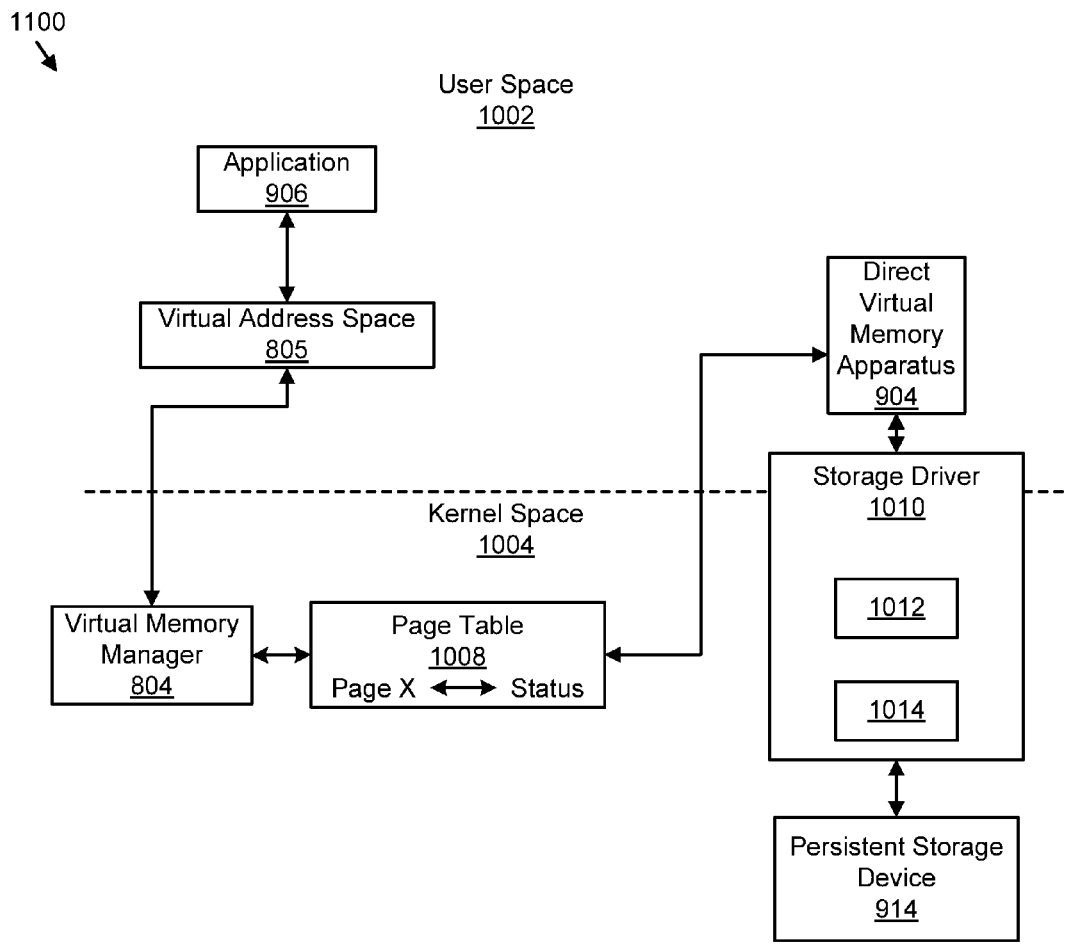
FIG. 11 is a schematic block diagram illustrating another embodiment of a system for application direct virtual memory management in accordance with the present invention.

FIG. 11 depicts one embodiment of a system 1100 for application direct virtual memory management in which the direct virtual memory apparatus 904 exclusively handles virtual memory swapping for the application 906 instead of the swap manager 807. FIG. 11 lacks the swap manager 1006 and the swap table 1007 of FIG. 10 because the direct virtual memory apparatus 904 assumes the responsibility of the swap manager 807. In the embodiment in which the direct virtual memory apparatus 904 exclusively handles virtual memory swapping, the direct virtual memory apparatus 904 may use a page fault, as described above, as a signal to retrieve pages from the persistent storage device 914 and return them to main memory 704. Furthermore, the index 1012 replaces the swap table 1007 and indicates the actual physical location of the pages that is swapped from main memory 704. In this embodiment, the application 906 may not use extended malloc commands to designate data pages for the direct virtual memory apparatus 904, and in one embodiment, data pages allocated using standard malloc commands are swapped by the direct virtual memory apparatus 904. Specifically, because pages do not need to be protected from the swap manager 807 which may be absent in this embodiment, the extended malloc command is not needed as the direct virtual memory apparatus 904 handles swapping for all pages, regardless of the manner of allocation.

Figure 12:
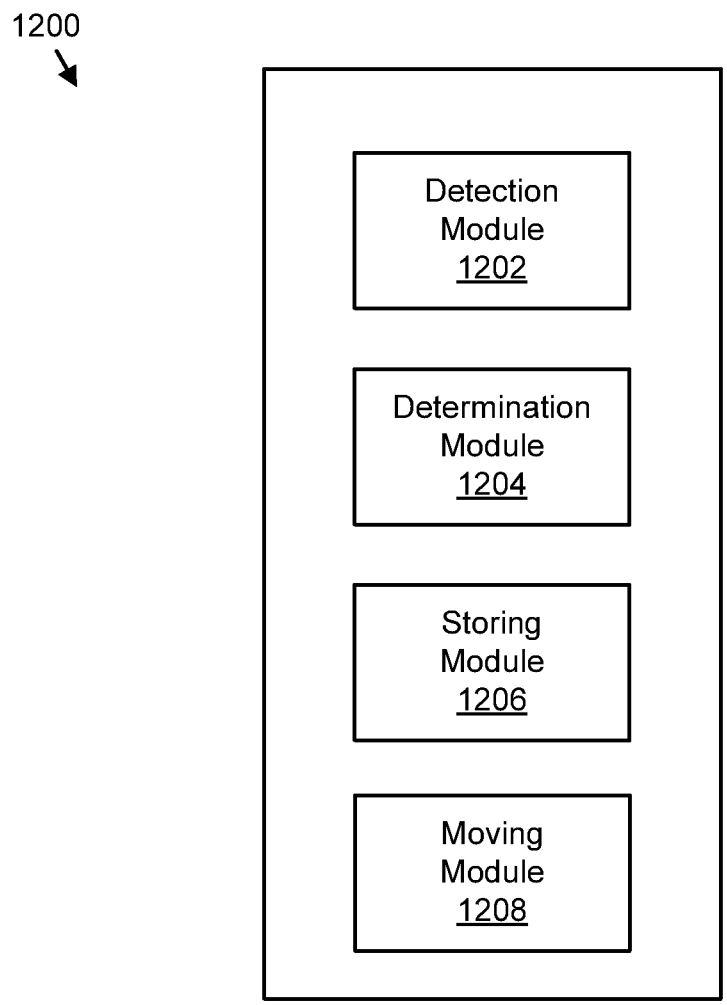
FIG. 12 is a schematic block diagram illustrating one embodiment of an apparatus for application direct virtual memory management in accordance with the present invention.

FIG. 12 illustrates one embodiment of an apparatus 1200 for application direct virtual memory management 1200. The apparatus 1200 includes a detection module 1202, a determination module 1204, a storing module 1206, and a moving module 1208. The apparatus 1200 may comprise one embodiment of the direct virtual memory apparatus 904. In addition, all or a portion of the modules may reside in one or more of the applications 906, in the operating system 802, and/or the storage controller 506.

The detection module 1202, in one embodiment, monitors for system memory accesses involving pages ("monitored pages") for which the apparatus 1200 handles swapping. The detection module 1202 may monitor pages for each executing application 906, such as, for example, if the apparatus 1200 is handling all virtual memory swapping for the computer system. In other embodiments, the detection module 1202 may monitor a subset of pages such as pages for a specific application 906 or a subset of pages for a specific application 906. System memory accesses, in one embodiment, serve as an indicator that a particular monitored page is to be moved to main memory 704 from the persistent storage device 914.

Specifically, the detection module 1202, in one embodiment, detects a system memory access to a virtual memory address within a monitored page of data not loaded in main memory 704 of a computing system. As described above, the system memory access may include a memory read or a memory write command to one or more pages. Furthermore, the system memory access may also be a system memory call (e.g. the extended malloc command) from an application 906 allocated the monitored page. The detection module 1202 may intercept a system memory call, determine whether the system memory call includes any virtual memory addresses corresponding to a monitored page, and signal the determination module 1204 in response to determining that the system memory call includes at least one of such virtual memory addresses.

In one embodiment, a system memory access may trigger a segmentation fault if the system memory access attempts to access a protected page, such as a page allocated using the extended malloc command. As described above, when the apparatus 1200 handles virtual memory swapping in addition to virtual memory swapping performed by the swap manager 807, a segmentation fault (triggered by an application attempting to access a swapped page that has been protected) signals the apparatus 1200 to move the page back into main memory 704.

When the apparatus 1200 exclusively handles virtual memory swapping, the system memory access may be a page fault. In one embodiment, the monitored page is allocated to an application 906 executing at run time. The monitored page may be allocated using standard allocation commands. In one embodiment, the monitored page has been allocated using the extended malloc command as described above, thereby indicating that the monitored page is to be monitored by the detection module 1202. In one embodiment, each page of main memory 704 is allocated to one or more applications 906 (e.g. main memory is "full") when the detection module 1202 detects the system memory access. Therefore, in one embodiment, one or more data pages are swapped out of main memory 704 as described below, to make room for the monitored page to be swapped in.

As stated above, in certain embodiments, the apparatus 1200 performs virtual memory swapping in addition to that performed by the swap manager 807, using a segfault as a signal to swap pages out of and back into main memory 704. Therefore, in certain embodiments, the detection module 1202 comprises a segfault handler as described below. In one embodiment, the detection module 1202 comprises a user space shared library that monitors, detects, and/or intercepts system memory calls from applications 906 in user space.

The determination module 1204, in one embodiment, determines, obtains, and/or computes addresses for pages to be stored from main memory 704 onto the persistent storage device 914. In one embodiment, before the monitored page may be loaded into main memory 704, one or more loaded pages (pages currently loaded in main memory 704) are swapped to the persistent storage device 914 by the apparatus 1200. The loaded page, like the monitored page above, may also be allocated to an application 906 (either the same application or a different application) executing at runtime. The addresses determined by the determination module 1204, referred to herein as swap addresses, may be virtual addresses used by the index 1012 of the storage driver 1010 to reference pages swapped to the persistent storage device 914 by the apparatus 1200.

Specifically, in one embodiment, the determination module 1204 determines a first swap address for a loaded page of data in main memory 704. The swap address may be defined in a sparse virtual address space 1014 exposed by the persistent storage device 914.

The persistent storage device 914 may comprise, but is not limited to memory modules, memory media, storage media, one or more storage devices, a solid-state storage device 102, and/or the like. The persistent storage device 914 may be embodied as a storage device within the computer system or as a storage device in another computer system in communication with the computer system. Advantageously, the persistent storage device 914 has an I/O latency between the latency of RAM and the latency of conventional disk drive storage devices.

In certain embodiments, the swap address is associated in an index with a storage location on the media of the persistent storage device 914. As described above, the index 1012 is managed by the persistent storage device 914 (e.g. a device driver managing the persistent storage device 914).

In certain embodiments, swap addresses comprise logical block addresses ("LBA"s) used by the index 1012. The determination module 1204 initiates mapping of the swap addresses to physical locations for the pages on media of the persistent storage 810 by using the exposed sparse virtual address space 1014 of the logical-to-physical translation layer 512. Each swap address, implemented as an LBA, may be a node in the index 1012 associated with stored data in the persistent storage device 914. Specifically, in one embodiment, a swap address is a node in the index 1012 structure (e.g. a tree as described above) that represents a logical block address and includes a corresponding physical block address.

In certain embodiments, physical locations on memory media of the persistent storage device 914 that are associated with swap addresses are deterministic storage locations. In one embodiment, a deterministic storage location comprises a physical storage location on memory media that is determined and/or managed by the persistent storage device 914. A deterministic storage location may comprise a next available storage location such as a next free page in an ordered free pages pool. A deterministic storage location may also comprise an append point of a sequential log-based writing structure persisted on the persistent storage device 914. The deterministic storage location may be defined before data is stored on the media or after data is stored on the media. For example, in one embodiment, the storage driver 1010 determines a physical location on the media and then stores the data. In another embodiment, the data is sent for storage on the media and a write agent 404 (as described above in relation to FIG. 4) reports the physical location to the storage driver 1010.

The sequential log-based writing structure may store the loaded page together with the swap address. The index associates the swap address of the sparse virtual address space 1014 with physical media storage locations. A deterministic storage location may be related to the swap address in a direct mapped relationship (e.g. the swap address is an LBA pointing to only one physical block, or the swap address may comprise an LBA that may be mapped to any physical block on the storage media). In one embodiment, the deterministic storage location is related to the swap address in a many-to-many relationship and a current address of the deterministic storage location is maintained by the index of the persistent storage device 914.

The determination module 1204 may determine a swap address with a direct mapping function, a hash function, and/or the like as described below. In one embodiment, the determination module 1204 determines a swap address for a page each time a page is swapped, whether or not the page has been swapped before (and already has an existing swap address in the index 1012). Because the exposed sparse virtual address space 1014 is a sparse address space in which the number of logical identifiers available greatly exceed the number of possible physical addresses, the exposed sparse address space 1014 may accommodate numerous swap addresses, hashing into the swap address space, and the like, with minimal or no risk of duplicate addresses. For example, the determination module 1204 may directly map a virtual memory address for a page using the virtual memory address plus an offset (e.g. if the offset is 4, virtual memory address 5 maps to LBA 9, virtual memory address 6 maps to LBA 10, and the like).

In one embodiment, the determination module 1204 derives a swap address for a page from a unique application identifier (e.g. a process ID) for the application 906 associated with the page. In one embodiment, the determination module 1204 derives the swap address for a page using the unique application identifier and the virtual memory address of the page. For example, the determination module 1204 may input the unique application identifier and the virtual memory address into a hash function to obtain the swap address as described below.

In one embodiment, the determination module 1204 determines a swap address for a page based on data content of the page. As described below, the determination module 1204 and/or the hash module 1308 may determine the swap address using a signature representing data of the page. Therefore, two identical pages would have the same signature. In one embodiment, if the hash function can reasonably avoid hash collisions for pages that are not identical, the determination module 1204 may determine two pages with the same determined swap address are identical. As described below, the storing module 1206 may use a form of deduplication and instead of storing a duplicate page onto the persistent storage device 914 when two pages share a common signature, increment a reference count corresponding to the earlier stored page.

The storing module 1206, in one embodiment, copies data pages from main memory 704 to the persistent storage device 914. In one embodiment, the storing module 1206 stores the loaded page on a persistent storage device 914 at the first deterministic storage location. If the loaded page has already been stored on the persistent storage device 914, the loaded page may already have a swap address represented in the index 1012 (e.g. a node exists in the index 1012 for the loaded page). In certain embodiments, the storing module 1206 associates the swap address for the loaded page with the swap address of the loaded page found in the index 1012. For example, the storing module 1206 may create a node in the index 1012 for the first swap address and map a deterministic storage location on the media of the persistent storage device 914 to the node. The storing module 1206 may store the loaded page at this deterministic storage location.

In one embodiment, a deterministic storage location at which a page is stored varies each time the page is swapped to the persistent storage device 914. For example, the moving module 1208, described below, may move the loaded page back into main memory after the loaded page has been stored on the persistent storage device 914. On a subsequent swap (e.g. when the loaded page is moved back to the persistent storage device 914 after having already been stored there) the storing module 1206 may store the loaded page at a deterministic location different than the first deterministic location and update the index 1012 to associate this deterministic location with the same original swap address. For example, on the subsequent swap, the swap address remains the same (e.g. the same LBA value), but the actual location where the page is stored may be at a different append point.

In the embodiment described above in which a swap address is based on content of a page, if an identical page to the loaded page is already stored on the persistent storage device 914, to avoid storing a duplicate page, the storing module 1206 may not store the loaded page. In the embodiment, the storing module 1206 skips storing the loaded page to the persistent storage device 914 in response to the determination module 1204 determining that a swap address for a first page matches a swap address associated with an existing page stored on the persistent storage device 914 (e.g. the signature for the first page and the existing page match). Accordingly, the storage module 1206 increments a reference count associated with the existing swap address (the moving module 1208 described below may decrement the reference count for a page moved back to main memory 704).

The storing module 1206 copies pages from this allocated portion of main memory to the persistent storage device 914 directly 908 through the direct interface 510 to the logical-to-physical translation layer 512. In one embodiment, the storing module 1206 may store pages through the block I/O emulation interface 508. In other words, the storing module 1206 may issue standard block I/O commands to store pages of data on the persistent storage device 914. The storing module 1206 may store page data according to memory operation protocols. The storing module 1206 may store to the persistent storage device 914 directly 908 through the direct interface 510 to the logical-to-physical translation layer 512. In one embodiment, the storing module 1206 may store pages through the block I/O emulation interface 508.

The hash module 1308 may translate a requested load or store of one or more addressable units into a read or write of the page that holds the requested addressable unit(s). Therefore, the storing module 1206, in one embodiment, instead of storing data on the persistent storage device 914 by sector, stores a page of data corresponding to a particular unique address from the hash module 1308 as described below.

In one embodiment, the storing module 1206 may store pages from main memory 704 to the persistent storage device 914 in a single location. In certain embodiments, the storing module 1206 may replicate the pages on one or more storage devices. For example, the storing module 1206 may automatically store one or more copies of an application's 906 memory across multiple storage devices (e.g. drives, chips, and the like). In one embodiment, the storing module 1206 supports copy-on-write and automatically creates one or more duplicate copies of the pages without awareness of a higher-level application 906. In one embodiment, the storing module 1206 receives an acknowledgment from each storage device to which it copies the pages before acknowledging a successful swap operation. In some embodiments, the storing module 1206 acknowledging a successful storing operation after receiving an acknowledgment from a specific storage device (i.e. where a primary copy of the pages reside).

The multiple storage devices receiving one or more duplicate copies may include remote storage devices, storage devices attached to different I/O controllers, and the like. In one embodiment, the storing module 1206 includes user-configurable swap settings to determine an amount of redundancy, to identify which devices to copy swapped memory, and the like. In some embodiments, the storing module 1206 utilizes PCIe multicast and/or accelerator operations for replicating writes across multiple storage devices.

The moving module 1208, in one embodiment, moves the monitored page from a deterministic storage location associated with the monitored page to the main memory 704. The second deterministic storage location may be associated with a second swap address in the index 1012. As with the first deterministic storage location, the second deterministic storage location may be located on, and managed by, the persistent storage device 914 and may comprise a physical address of an append point as described above. The moving module 1208 may determine the swap address for the monitored page similar to the determination module 1202 determining the swap address for the loaded page (e.g. using a hash function with process id for the application allocated the monitored page and the virtual memory address, using a direct mapping, and the like). Specifically, the swap address is computed in one embodiment by passing the process id of the application associated with the monitored page and the virtual address of the request through the hashing function. The swap address then serves as the key to the index 1012 to locate the monitored page on the persistent storage device 914.

In one embodiment, the moving module 1208 moves and/or copies one or more pages from the persistent storage device 914 to main memory 704 and returns from the segfault. In one embodiment, the moving module 1208 may use sequential prefetching when copying pages to main memory 704. Specifically, the moving module 1208 may copy additional pages adjacent to pages that the application is attempting to access such that these additional pages are available in main memory 704 should the application request them. As described above, multiple copies of the swapped pages may exist on multiple storage devices, local and/or remote. In one embodiment, reads of the swapped page data are served from physically closest copies. In one embodiment, the moving module 1208 may use prefetching in cooperation with the optimization module 1310 to implement intelligent prefetching as directed by information/hints/directives from the application 906. In one embodiment, when a page has an associated reference count, the moving module 1208 may decrement the reference count for a page moved back to main memory 704.

Figure 13:
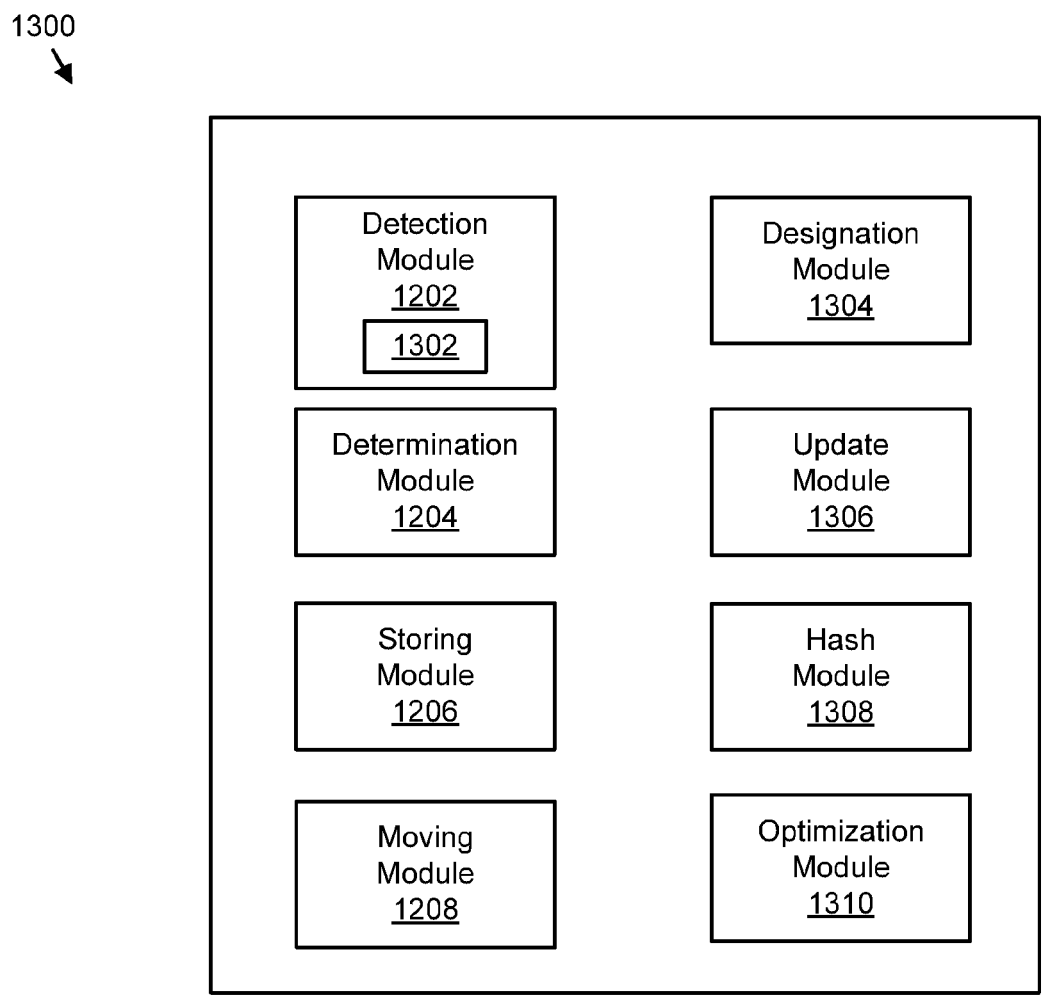
FIG. 13 is a schematic block diagram illustrating another embodiment of an apparatus for application direct virtual memory management in accordance with the present invention.

FIG. 13 illustrates another embodiment of an apparatus 1300 for application direct virtual memory management 1300. The apparatus 1300 may comprise one embodiment of the direct virtual memory apparatus 904. In one embodiment, the direct virtual memory apparatus 904 comprises a dynamically loadable module that an application 906 can cause to be loaded based on how the application 906 is compiled or linked. In this manner the source code for the application 906 may remain unchanged and the application 906 loads the direct virtual memory apparatus 904 to gain the benefits of direct access to the memory swap features of the present invention.

The apparatus, in the depicted embodiment, includes the detection module 1202, the determination module 1204, the storing module 1206, and the moving module 1208 described above with regard to FIG. 12, and the detection module 1202 includes a segfault handler 1302 and the apparatus further includes a designation module 1304, an update module 1306, a hash module 1308, and an optimization module 1310. Similar to the apparatus of FIG. 13, all or a portion of the modules may reside in one or more of the applications 906, in the operating system 802, and/or the storage controller 506.

The segfault handler 1302, in one embodiment, intercepts a segfault from the operating system 802 to the application 906 and uses the segfault as a signal to fetch pages from the persistent storage device 914 that have been swapped from main memory. In certain embodiments, the operating system 802 may use the swap manager 807 to provide virtual memory support for other applications 906, while a segfault for one or more applications 906 may be routed to the segfault handler1302. In certain embodiments, all or a portion of the segfault handler1302 resides in a shared resource (thread, service, application, library) in user space 902 accessible by applications 906, resides in one or more applications 906, and/or resides in the operating system 802. For example, in one embodiment, one or more applications 906 may have their own segfault handler1302, which forward segfault calls to the segfault handler1302. Consequently, the segfault handler1302 1004 may use an existing mechanism, the segfault process, as a signal to swap pages back into main memory 704.

The designation module 1304, in one embodiment, designates a set of virtual memory address (typically contiguous ranges of addresses) that corresponds to one or more monitored pages. Specifically, the designation module 1304 issues a command to protect the virtual memory addresses for pages swapped to the persistent storage device 914. As stated above, the designation module 1304 may issue an "mprotect" command for pages that are not loaded in main memory 704. The designation module 1304 sets aside a certain number of virtual memory pages for use and management by the direct virtual memory apparatus 904.

In one embodiment, the designation module 1304, after pages have been copied to main memory 704, may indicate that the page is available for access by the operating system 802 (e.g. by unprotecting the main memory range for those pages using an unprotect memory command).

The update module 1306, in one embodiment, updates a page table entry for a monitored page to indicate the monitored page is loaded in main memory 704. In one embodiment, the update module 1306, after a page (e.g. the monitored page) has been moved back into main memory 704, updates the page table entry for the page such that the application 906, upon returning from the segfault, obtains access to data of the page. Specifically, after an application 906 returns from a segfault, the operating system 802 retries the data access operation that previously failed. Consequently, the operating system 802 tries to access memory within the page range again and, finding the range unprotected, the page table entry updated, and the page stored in main memory 704, successfully access the requested data of the page.

The hash module 1308, in one embodiment, generates an address for use in storing each page in the sparse virtual address space 1014 presented by the logical-to-physical translation layer 512. In one embodiment, the hash module 1308 executes a hash function to uniquely map a swapped page into the exposed sparse virtual address space 1014. The output of the hash function comprises a the swap address for the swapped page. From the perspective of the storage controller 506, the unique identifier for each swapped page is treated as a logical block address, in certain embodiments. Specifically, for pages to be stored/retrieved using application direct virtual memory management, the hash module 1308 may hash a unique application identifier (e.g. a process id for application 906) combined with a virtual memory address for a page in the application's virtual address space 805 using a hash function to obtain the unique identifier for the pages in the sparse virtual address space 1014. In one embodiment, the unique application identifier is a process ID (assigned by the operating system 802) for an application 906. The hash module 1308, in certain embodiments, is part of the determination module 1204, in communication with the determination module 1204, and/or works in conjunction with the determination module 1204 to determine a swap address.

A hash function is a deterministic function that converts an initial value, a key, from a domain into a value in a range (or hash value). In certain embodiments of the present invention, the range may be significantly smaller than the domain. In other embodiments, the cardinality of the range matches the cardinality of the domain. A hash collision occurs when two distinct initial values provided as input to a hash function result in an identical hash value result. A hash function that maps each key to a distinct hash value result is called a perfect hash function. However, perfect hash functions generally require that key values in the domain be of a fixed cardinality and are predetermined.

Nevertheless, because the storage controller 506 presents a very large and sparse address space, the hash module 1308 may utilize a hash function and a range of such a large size (up to 64 bits or more) to obtain near perfect hashing. Specifically, the chances of a collision are based in part on a ratio of a domain size to a range size. As the ratio of the domain size to the range size increases, the chance of a collision increases. In one embodiment, the size of the address space (the range) is sufficiently large in comparison with a potential number of swapped pages (the domain) to substantially avoid collisions as the larger the range of possible hash values, the less likely collisions will occur. In one embodiment, the hash module 1308 uses an address space of a particular size to approximate an optimal domain size to range size ratio. For example, in one embodiment, the address space comprises a 32-bit address space providing 4,294,967,296 possible distinct hash values. In one embodiment, the address space is a 48-bit address space. In yet another embodiment, the address space comprises a 64-bit address space.

In one embodiment, a user may configure the size of the address space based on an estimated number of pages that the hash module 1308 may store in the address space to ensure an optimal domain to range ratio. In one embodiment, the hash module 1308, direct interface 510, logical-to-physical translation layer 512, and/or storage controller 506 may deterministically modify the address space size, increasing or decreasing the address space or deterministically adjusting the inputs to the hash function, as needed to prevent collisions. The hash module 1308 may rely on the sparse logical address space such that in most cases, each application identifier and virtual memory address results in a unique hash value.

As stated above, often hash functions have a non-zero probability of a collision. One of skill in the art will recognize how to trade simplicity and speed of the hash function used with strength of a hash function, which is typically a measure of how many collisions might be expected for the hash function. In addition to an optimum domain size to range size ratio, the hash module 1308 may reduce the chances of a collision with an adequate hash function. In one embodiment, the hash module 1308 uses a Secure Hash Algorithm 1 ("SHA-1") hash function, a Message-Digest Algorithm 5 ("MD5") hash function, or the like. In one embodiment, the chance of a collision is small enough, that if a collision were to occur, the hash module 1308 may return an error and/or determine that it cannot swap the particular pages instead of managing the collision (e.g. with a linked list at the particular hash value for the collision).

In one embodiment, if the hash module 1308 detects a collision, the hash module 1308 signals the storing module 1206 to swap a different page out of main memory 704. In one embodiment, if the hash module 1308 detects a collision, the hash module 1308 hashes a third value along with the unique application identifier and swap page identifier to obtain a different hash value and avoid the collision. This third value is a deterministically reproducible value such as for example a sequence number of a logical erase block for the LEB that stores the swap page. The sequence number may be used to maintain the log-based, append only writing structure for managing storing of data and retrieving data from the persistent storage device 914.

Furthermore, the risk of collision exists when the hash module 1308 generates a new hash value for a page that has not yet been swapped (stored on the storage device), as updates to previously stored pages will use previously determined hash values, as unique swap page identifiers. In addition, the hash module 1308 may detect a collision by referencing the logical-to-physical translation layer 512. Specifically, LBAs (representative of a hash key value) that are already assigned in the index 1012 already have a node in the map or tree. The storage controller 506 may quickly traverse the index 1012 to determine the existence of a particular node representing an LBA. In one embodiment, the index 1012 only includes a node or entry for logical addresses that are associated with currently stored data on the physical storage medium of the persistent storage device 914. In this embodiment, membership in the forward map may represent valid allocated blocks on the persistent storage media. The storage controller 506, in one embodiment, adds entries, nodes, and the like to the index 1012 as data is stored on the persistent media and removes entries, nodes, and the like from the index 1012 in response to data being invalidated cleared, trimmed, or otherwise removed from the persistent media. Therefore, existence of a node or entry in the index 1012 represents an LBA that is "taken," "exists," or is allocated, meaning that a collision has occurred.

The hash module 1308 determines addresses for lookups/reads and writes according to the hash function to obtain consistent addresses. In certain embodiments, the hash module 1308 determines swap addresses every time a page swap is performed, once for the page being swapped out and once to determine the swap address (in the exposed sparse virtual address space) for the page being swapped in. In one embodiment, the hash module 1308 determines a swap address for a page even if the page has been swapped before (and a swap address exists in the index 1012). Furthermore, by hashing into an exposed sparse virtual address space of the pre-existing logical-to-physical translation layer 512, the hash module 1308 eliminates the need for duplicate logical-to-physical translation layers, costly swap table lookups, or the like. Moreover, a hash function saves time and resources over a swap table lookup because a hash function is a constant time equation, not a table lookup or a tree traversal which may involve a variable time lookup depending on where the entry is located in the table or tree.

In one embodiment, as described above, a swap address is based on content of a page. Specifically, the swap address computed by the hash function may be based on a signature of the page. In one embodiment, the hash function computes a signature for a portion of a page (e.g. the 100,000 K or last 100,000 K). In one embodiment, if the page portions yield a preliminary match, the hash module 1308 computes and compares signatures for entire pages. Therefore, if the hash function arrives at a swap address for a first page that is the same as the swap address for a second page already stored, the first and second pages are identical. The storing module 1206 may skip storing the first page. The storing module 1206 and/or hash module 1308 may increment a reference count associated with the second swap address.

The optimization module 1310 optimizes virtual memory swapping for a specific application 906, a group of applications 906, a storage medium, and/or a computing system as a whole. In one embodiment, the optimization module 1310 optimizes virtual memory for a particular application 906. For example, for a database application 906, the optimization module 1310 may maintain hot data such as the database application's log in main memory 704, but direct the storing module 1206 to swap out colder data such as the actual database data.

In one embodiment, the optimization module 1310 receives hints from applications 906 on virtual memory usage. The hint may comprise a suggestion or instruction to move one or more particular pages from main memory 704 to the persistent storage device 914, to move one or more particular pages from the persistent storage device 914 to main memory 704, to pin one or more particular pages in main memory 704, and/or to unpin one or more particular pages in main memory 704. For example, the optimization module 1310 may provide an API to receive hints as to specific pages to swap and/or to leave in main memory 704. In some embodiments, the optimization module 1310 determines virtual memory usage for an application 906 based on an application's 906 history. The optimization module 1310 may also optimize virtual memory usage for a certain type of storage medium such as flash. In one embodiment, the hint may comprise a notification without a requirement for action by the optimization module 1310 (e.g. the optimization module 1310 may comply with the hint or not). In another embodiment, the hint comprises a directive that requires the optimization module 1310 to carry out the instruction given by the hint.

The optimization module 1310 may support sequential pre-fetching and/or intelligent preloading (e.g. each time page x is loaded, page s is loaded, so load page s in connection with loading page x) and other autonomic learned behavior. The optimization module 1310 may also consider performance factors in swapping—how much main memory to offload, latency considerations, and the like. In one embodiment, the optimization module 1310 may swap pages in main memory 704 that aren't active so that data that is more active is placed in main memory 704. For example, an application 906 may periodically determine whether certain pages in memory 704 have been used and send hints to the optimization module 1310 to swap pages for these less active pages.

Figure 14:
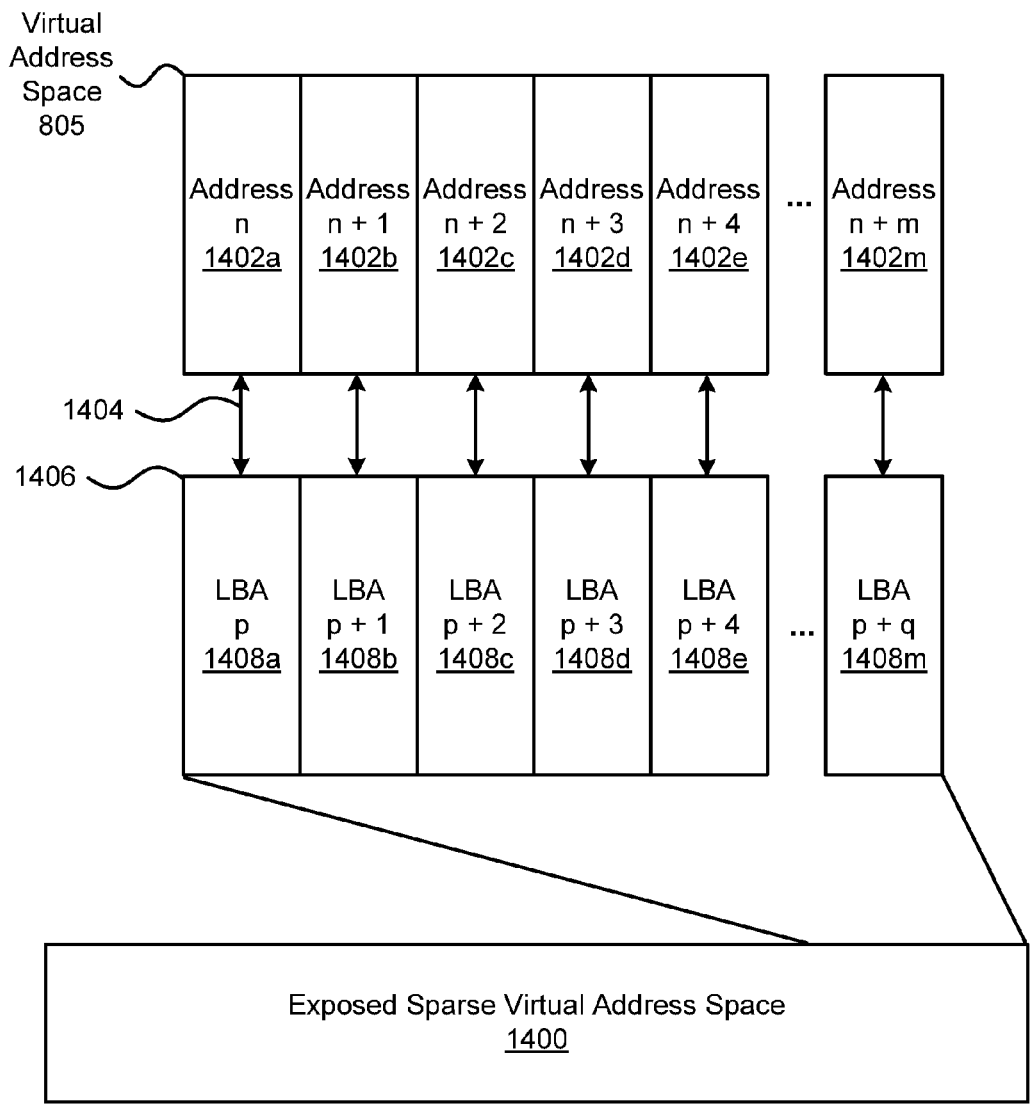
FIG. 14 is a schematic block diagram illustrating one embodiment of a relationship between a virtual address space of an application and a virtual address space exposed by a persistent storage device in accordance with the present invention.

FIG. 14 depicts one embodiment of a relationship between a virtual address space 805 of an application 906 and a virtual address space 1400 exposed by the persistent storage device 914. Specifically, FIG. 14 depicts a direct mapping 1404 between addresses 1402*a-m* for data pages in the virtual address space 805 and LBAs (e.g. swap addresses) 1408*a-m* in the sparse exposed sparse virtual address space 1400. As used herein, a direct mapping means a direct relationship between each address in a domain and each corresponding address in a range. For each address in the domain there is exactly one corresponding address in the range. As described above, the determination module 1204 may directly map virtual memory addresses 1402*a-m* of the application 906 to LBAs 1408*a-m* using an offset.

Figure 15A:
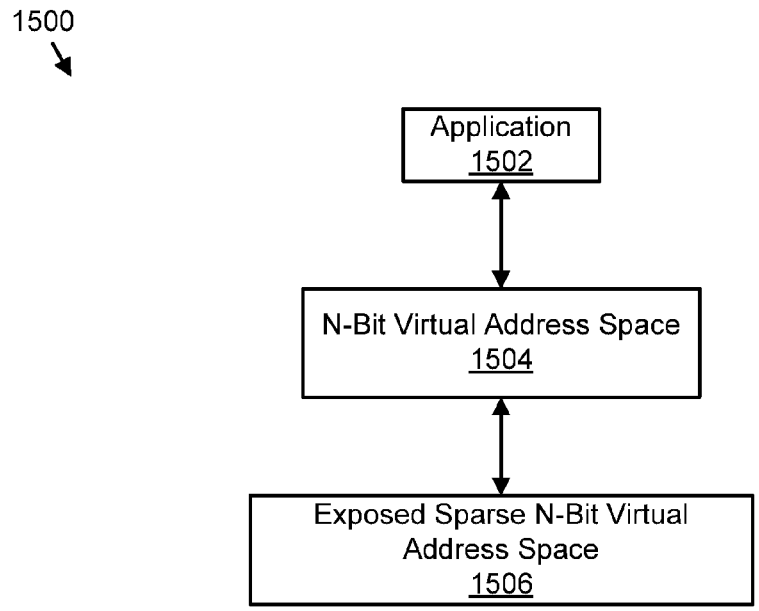
FIG. 15A is a schematic block diagram illustrating another embodiment of a relationship between a virtual address space of an application and a virtual address space exposed by a persistent storage device in accordance with the present invention.

FIG. 15A depicts another embodiment of a relationship 1500 between a virtual address space 1504 of an application 1502 and a virtual address space 1506 exposed by the persistent storage device 914. Embodiments of the present invention manage pages with the virtual address space 1506 exposed by the persistent storage device 914. (e.g. protecting pages and unprotecting pages, etc.) Similar to the embodiment depicted in FIG. 14, the N-bit virtual address space 1504 of an application 1502 may map directly with an N-bit portion of a sparse virtual address space 1506 exposed by the persistent storage device 914 (virtual memory addresses mapped directly to swap addresses).

Figure 15B:
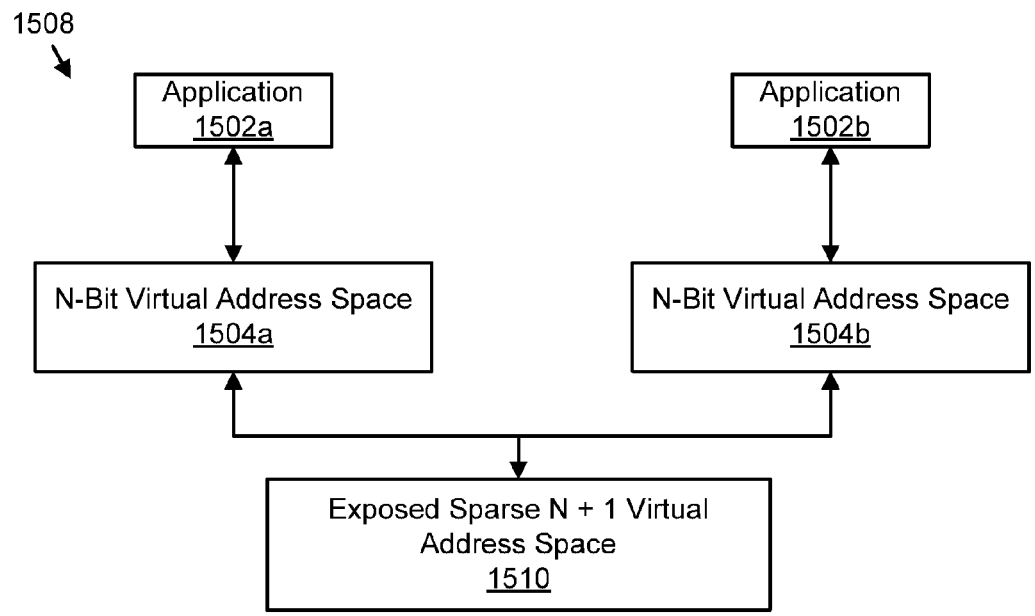
FIG. 15B is a schematic block diagram illustrating another embodiment of a relationship between a virtual address space of an application and a virtual address space exposed by a persistent storage device in accordance with the present invention.

FIG. 15B depicts an embodiment of a relationship between two virtual address spaces 1504*a,b* for two applications 1502*a,b* respectively and a virtual address space exposed by persistent storage 1510. While two applications 1502*a,b* are depicted, any suitable number of applications may be directly mapped to the exposed sparse virtual address space 1510. The exposed sparse virtual address space 1510 includes at least N bits plus one or more additional high order bits for each addition number of applications that progress by powers of two. So for 0-2 applications, one added bit is required, for 3-4 applications 2 added bits are required, for 5-8 applications, 3 added bits are required and so forth for as many applications as the present invention supports. The N number of bits of the exposed sparse virtual address space 1510 accommodates the N number of bits of each virtual address space of each application while the added bits distinguishes between the different applications 1502*a,b* (and virtual address spaces 1504*a, b*). For example, if a first and a second application 1502*a,b* map directly to the exposed sparse virtual address space 1510, an extra bit set to 0 may represent the first application 1502*a* and an extra bit of 1 may represent the second application 1502*b*.

Figure 16:
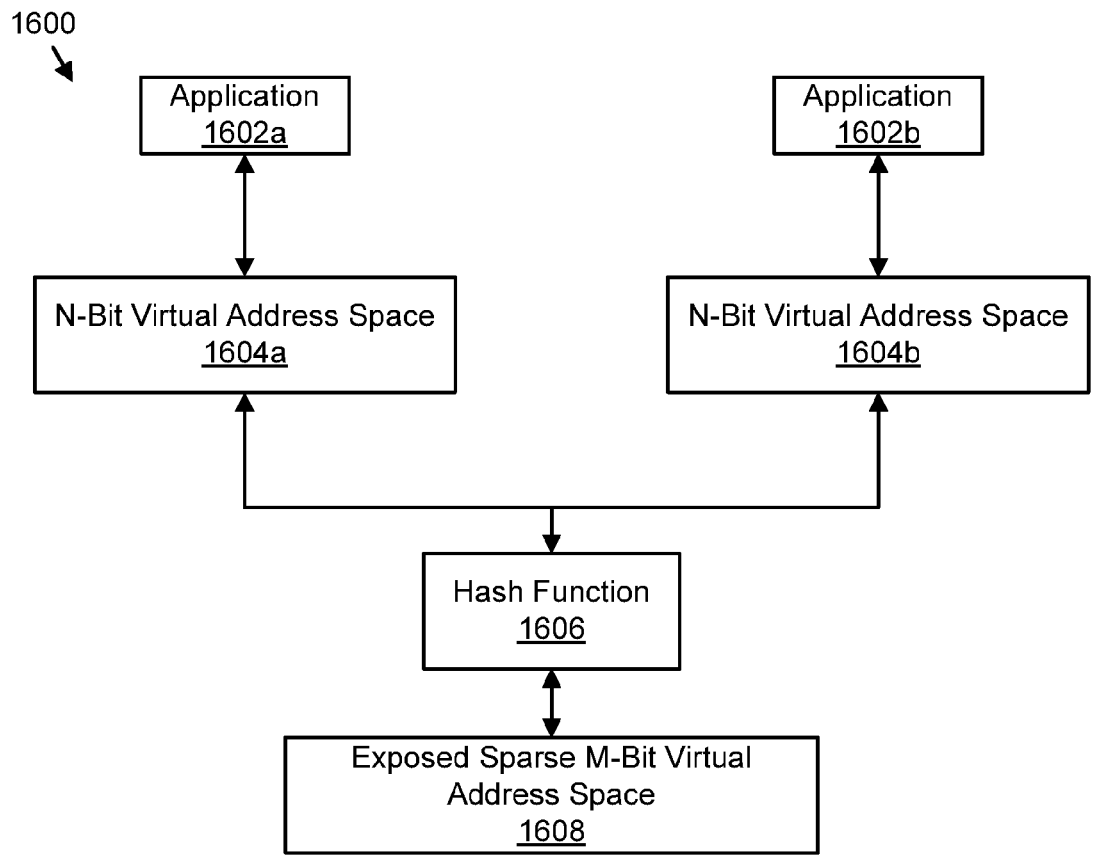
FIG. 16 is a schematic block diagram illustrating one embodiment of a relationship between multiple virtual address spaces and multiple applications with a hash function in accordance with the present invention.

FIG. 16 depicts an embodiment of a relationship 1600 between two virtual address spaces 1604*a,b* for two applications 1602*a,b* respectively and a sparse virtual address space exposed by persistent storage 1608 using a hash function 1606. The hash module 1308 may hash virtual addresses plus an application identifier for any suitable number of applications into a common exposed sparse virtual address space using a hash function to obtain unique swap address values for the exposed M-bit virtual address space.

Figure 17A:
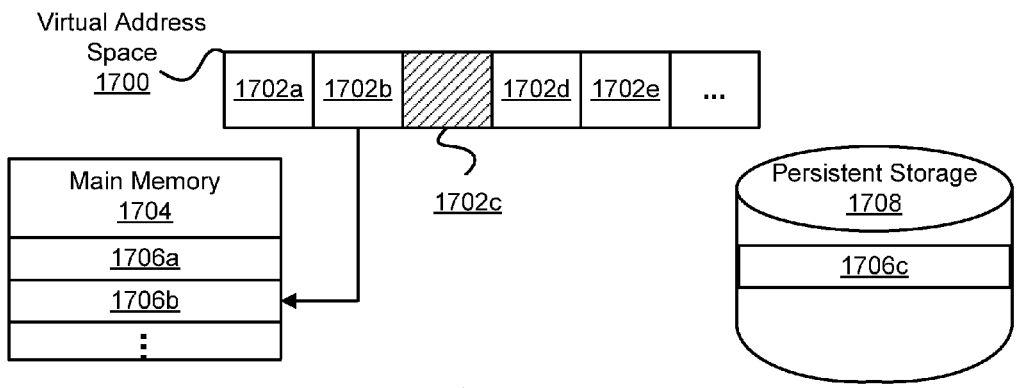
FIG. 17A is a schematic block diagram illustrating one embodiment of a virtual address space, main memory, and persistent storage in accordance with the present invention.
Figure 17B:
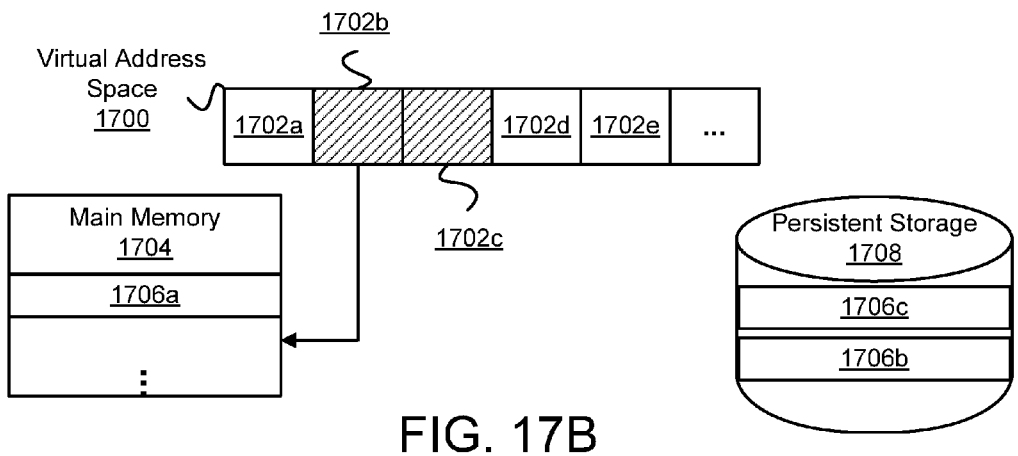
FIG. 17B is a schematic block diagram illustrating the virtual address space, main memory, and persistent storage of FIG. 15A with a data page moved to persistent storage in accordance with the present invention.
Figure 17C:
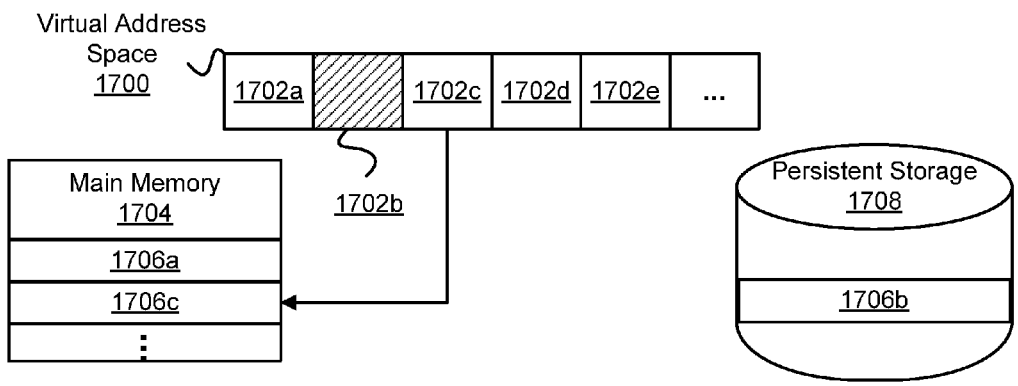
FIG. 17C is a schematic block diagram illustrating the virtual address space, main memory, and persistent storage of FIG. 15A with a data page moved to main memory in accordance with the present invention.

FIGS. 17A-C depict one embodiment of a virtual address space 1700 for an application 906, main memory 1704, and a persistent storage device 1708. In FIGS. 17A-C a data page 1706*b* is depicted being swapped with a monitored page 1706*c*. A system access request has been received for data in monitored page 1706*c*. As depicted in FIG. 17A, the storing module 1206 previously stored data page 1706*c* onto the persistent storage device 1708 and the designation module 1304 previously protected the virtual address range 1702*c* for page 1706*c*. Furthermore, virtual address range 1702*b* is associated with data page 1706*b* in main memory 1704. In FIG. 17B, the designation module 1304 protects the virtual address range 1702*b* corresponding to data page 1706*b* and the storing module 1206 stores data page 1706*b* onto the persistent storage device 1708. It should be noted that virtual address range 1702*b* is protected first before the data is swapped to ensure that no system access calls for page 1706*b* are received or serviced during the swapping operation. In FIG. 17C, the moving module 1208 moves data page 1706*c* located using the swap address to main memory 1704 and the designation module 1304 unprotects the virtual address 1702*c* corresponding to data page 1706*c* now loaded in main memory 1704.

Figure 18:
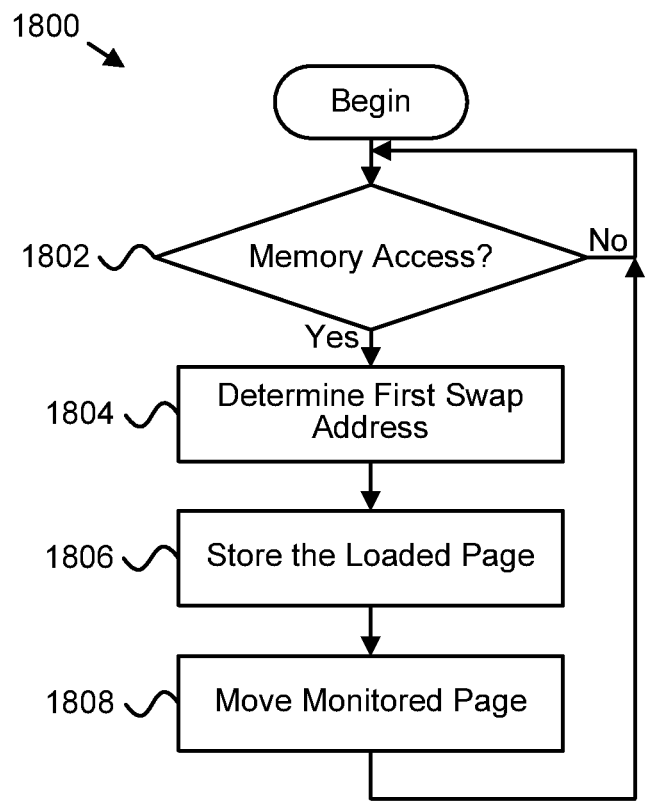
FIG. 18 is a schematic flow chart diagram illustrating one embodiment of a method for application direct virtual memory management in accordance with the present invention.

FIG. 18 depicts one embodiment of a method 1800 for application direct virtual memory management. The method 1800 begins, and the detection module 1202 monitors 1802 for a system memory access to a virtual memory address within one or more monitored pages of data not loaded in main memory 704 of a computer system. If the detection module 1202 detects 1802 the system memory access, the determination module 1204 determines 1804 a first swap address for a loaded page of data in the main memory 704. In certain embodiments, even though the loaded page may have been stored previously on a persistent storage device 914, the determination module 1204 determines 1804 the first swap address for a loaded page, which may be different from the last swap address used for the loaded page. As noted above, the swap address may be determined by hashing the process id of the loaded page and the virtual address of the request. In this manner, due to the sparse address space exposed and a hash function that sufficiently separates hash values computed, a new first swap address may be determined on each swap operation. The first swap address may be defined in a sparse virtual address space 1014 exposed by a persistent storage device 914 and the first swap address may be associated in an index 1012 with a first deterministic storage location. The index 1012 may be managed by the persistent storage device 914.

Next, the storing module 1206 stores 1806 the loaded page on a persistent storage device 914 at a deterministic storage location. The moving module 1208 determines the swap address for the monitored page and moves 1808 the monitored page from a second deterministic storage location (identified by finding the swap address in the index 1012, the node in the index 1012 maps the swap address to the second deterministic storage location) to the main memory 704. The second deterministic storage location, in one embodiment, is associated with a second swap address in the index 1012. The moving module 1208 may determine the swap address for the monitored page similar to the determination module 1202 determining the swap address for the loaded page (e.g. using a hash function with the virtual memory address, using a direct mapping, and the like). Specifically, the second swap address is computed in one embodiment by passing the process id of the application associated with the monitored page and the virtual address of the request through the hashing function. The second swap address then serves as the key to the index 1012 to locate the monitored page on the persistent storage device 914. The method 1800 returns and the detection module 1202 continues to monitor 1802 for a system memory access as described above.

Figure 19:
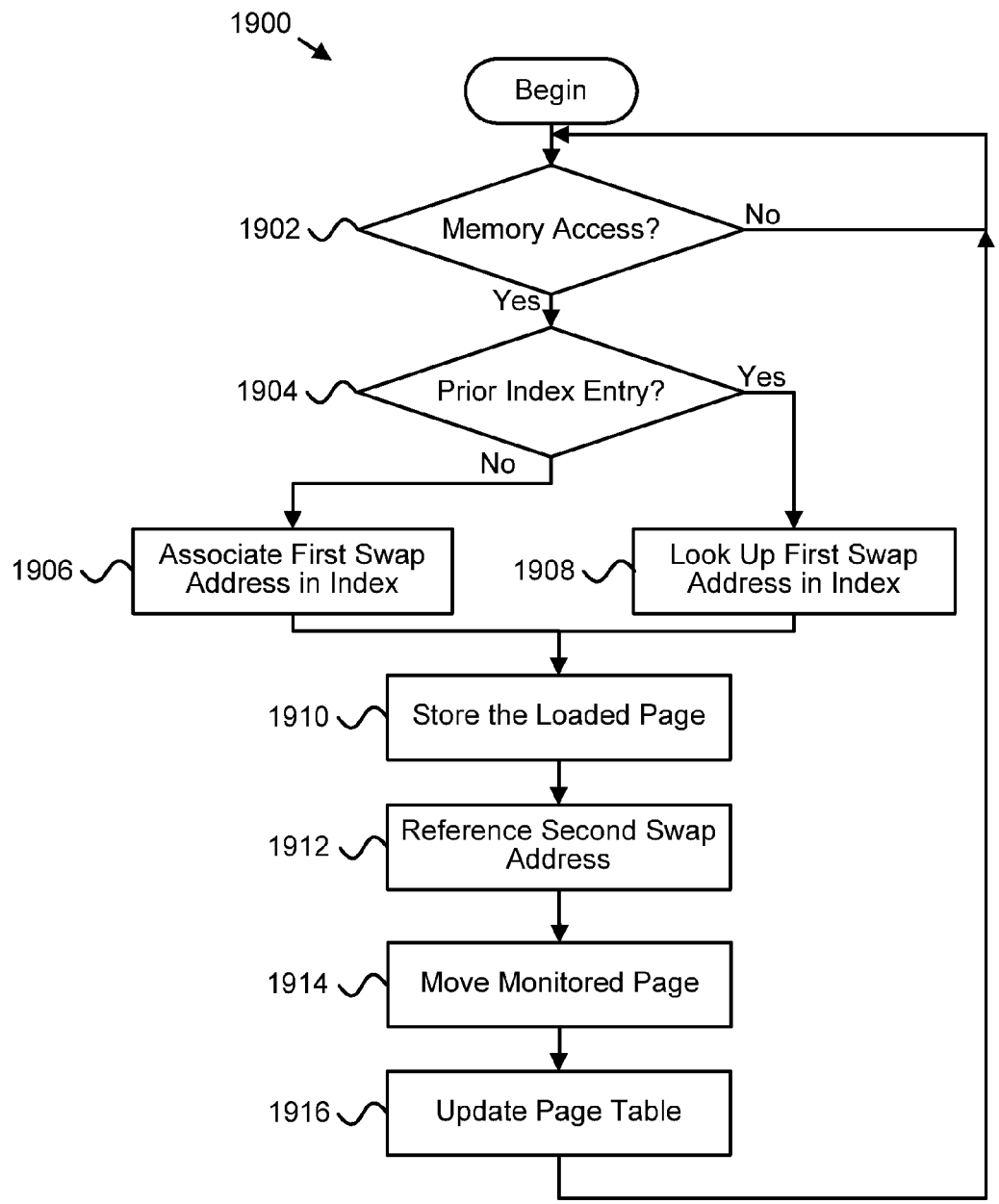
FIG. 19 is a schematic flow chart diagram illustrating another embodiment of a method for application direct virtual memory management in accordance with the present invention.

FIG. 19 depicts another embodiment of a method 1900 for application direct virtual memory management. The method 1900 begins, and the detection module 1202 monitors 1902 for a system memory access to a virtual memory address within one or more monitored pages of data not loaded in main memory 704 of a computer system. If the detection module 1202 detects 1902 the system memory access for a monitored page, the determination module 1204 determines a swap address (a first swap address) by determining 1904 whether an index entry has been created for the monitored page (e.g. the first swap address is represented as a node in the index 1012). As noted above, the first swap address may be determined by hashing the process id of the monitored page and the virtual address of the request. The first swap address serves as a key for the index entry, which may be in the index 1012. If the determination module 1204 determines 1904 that an index entry has been created, the storing module 1206 looks up 1908 the index entry for the first swap address. Alternatively, if an index entry has not been created (e.g. the loaded page has not been swapped out before), the storing module 1206 associates 1906 the first swap address with the loaded page in the index 1012.

Next, the storing module 1206 stores 1910 the loaded page on a persistent storage device 914 at the first deterministic storage location. The moving module 1208 moves 1914 the monitored page from a second deterministic storage location to the main memory 704. The second deterministic storage location, in one embodiment, is associated with a second swap address in the index 1012. The update module 1306 updates 1916 a page table entry for the monitored page to indicate the monitored page is loaded in main memory 704. The method 1900 returns and the detection module 1202 continues to monitor 1902 for a system memory access as described above.

Figure 20:
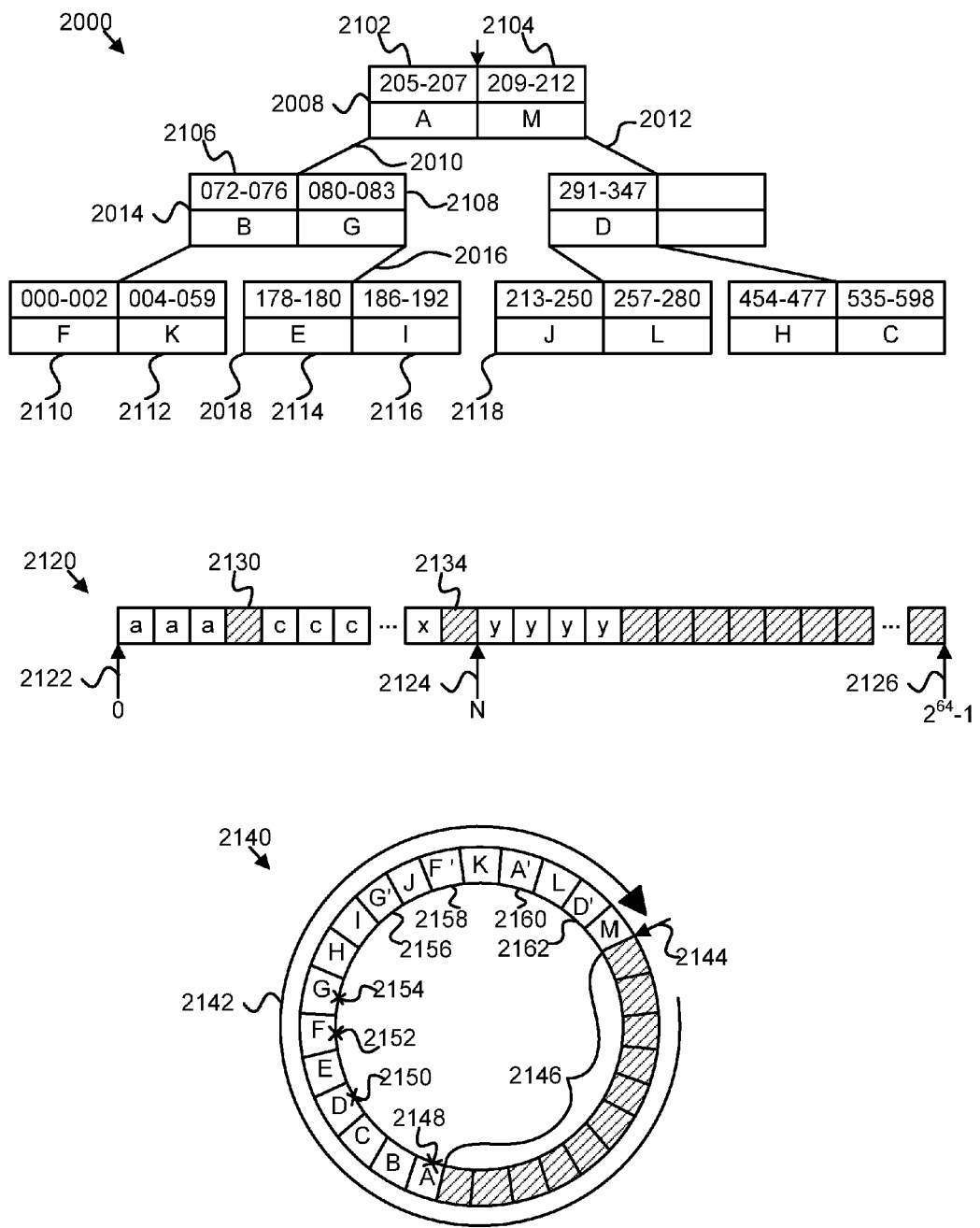
FIG. 20 is a schematic block diagram illustrating one embodiment of a mapping structure, a sparse logical address space, and a log-based writing structure in accordance with the present invention.

FIG. 20 depicts one embodiment of a mapping structure 2000, a logical address space 2120, and a sequential, log-based, append-only writing structure 2140. The mapping structure 2000, in one embodiment, is maintained by the logical-to-physical translation layer 512 of the storage controller 506 to map LBAs or other logical addresses to physical locations on the solid-state storage media 110. The mapping structure 2000, in the depicted embodiment, is a B-tree with several entries. In the depicted embodiment, the nodes of the mapping structure 2000 include direct references to physical locations in the solid-state storage device 102. In other embodiments, the mapping structure 2000 may include links that map to entries in a reverse map, or the like. The mapping structure 2000, in various embodiments, may be used either with or without a reverse map. In other embodiments, the references in the mapping structure 2000 may include alpha-numerical characters, hexadecimal characters, pointers, links, and the like.

The mapping structure 2000, in the depicted embodiment, includes a plurality of nodes. Each node, in the depicted embodiment, is capable of storing two entries. In other embodiments, each node may be capable of storing a greater number of entries, the number of entries at each level may change as the mapping structure 2000 grows or shrinks through use, or the like.

Each entry, in the depicted embodiment, maps a variable length range of LBAs of the solid-state storage device 102 to a physical location in the storage media 110 for the solid-state storage device 102. Further, while variable length ranges of LBAs, in the depicted embodiment, are represented by a starting address and an ending address, in other embodiments, a variable length range of LBAs may be represented by a starting address and a length, or the like. In one embodiment, the capital letters 'A' through 'M' represent a logical or physical erase block in the physical storage media 110 of the solid-state storage device 102 that stores the data of the corresponding range of LBAs. In other embodiments, the capital letters may represent other physical addresses or locations of the solid-state storage device 102. In the depicted embodiment, the capital letters 'A' through 'M' are also depicted in the log-based writing structure 2140 which represents the physical storage media 110 of the solid-state storage device 102.

In the depicted embodiment, membership in the mapping structure 2000 denotes membership (or storage) in the solid-state storage device 102. In another embodiment, an entry may further include an indicator of whether the solid-state storage device 102 stores data corresponding to a logical block within the range of LBAs, data of a reverse map, and/or other data.

In the depicted embodiment, the root node 2008 includes entries 2102, 2104 with noncontiguous ranges of LBAs. A "hole" exists at LBA "208" between the two entries 2102, 2104 of the root node. In one embodiment, a "hole" indicates that the solid-state storage device 102 does not store data corresponding to one or more LBAs corresponding to the "hole." In one embodiment, the solid-state storage device 102 supports block I/O requests (read, write, trim, etc.) with multiple contiguous and/or noncontiguous ranges of LBAs (i.e. ranges that include one or more "holes" in them). A "hole," in one embodiment, may be the result of a single block I/O request with two or more noncontiguous ranges of LBAs. In a further embodiment, a "hole" may be the result of several different block I/O requests with LBA ranges bordering the "hole."

In the depicted embodiment, similar "holes" or noncontiguous ranges of LBAs exist between the entries 2106, 2108 of the node 2014, between the entries 2110, 2112 of the left child node of the node 2014, between entries 2114, 2116 of the node 2018, and between entries of the node 2118. In one embodiment, similar "holes" may also exist between entries in parent nodes and child nodes. For example, in the depicted embodiment, a "hole" of LBAs "060-071" exists between the left entry 2106 of the node 2014 and the right entry 2112 of the left child node of the node 2014.

The "hole" at LBA "003," in the depicted embodiment, can also be seen in the logical address space 2120 of the solid-state storage device 102 at logical address "003" 2130. The hash marks at LBA "003" 2140 represent an empty location, or a location for which the solid-state storage device 102 does not store data. The "hole" at LBA 2134 in the logical address space 2120, is due to one or more block I/O requests with noncontiguous ranges, a trim or other deallocation command to the solid-state storage device 102, or the like. The mapping structure 2000 supports "holes," noncontiguous ranges of LBAs, and the like due to the sparse and/or thinly provisioned nature of the logical address space 2120.

The logical address space 2120 of the solid-state storage device 102, in the depicted embodiment, is sparse and/or thinly provisioned, and is larger than the physical storage capacity and corresponding storage device address space of the solid-state storage device 102. In the depicted embodiment, the solid-state storage device 102 has a 64 bit logical address space 2120 beginning at logical address "0" 2122 and extending to logical address "$2^{64}$-1" 2126. Because the storage device address space corresponds to only a subset of the logical address space 2120 of the solid-state storage device 102, the rest of the logical address space 2120 may be allocated, mapped, and used for other functions of the solid-state storage device 102.

The sequential, log-based, append-only writing structure 2140, in the depicted embodiment, is a logical representation of the physical storage media 110 of the solid-state storage device 102. In certain embodiments, the solid-state storage device 102 stores data sequentially, appending data to the log-based writing structure 2140 at an append point 2144. The solid-state storage device 102, in a further embodiment, uses a storage space recovery process, such as a garbage collection module or other storage space recovery module that re-uses non-volatile storage media 110 storing deallocated/unused logical blocks. Non-volatile storage media storing deallocated/unused logical blocks, in the depicted embodiment, is added to an available storage pool 2146 for the solid-state storage device 102. By clearing invalid data from the solid-state storage device 102, as described above, and adding the physical storage capacity corresponding to the cleared data back to the available storage pool 2146, in one embodiment, the log-based writing structure 2140 is cyclic, ring-like, and has a theoretically infinite capacity.

In the depicted embodiment, the append point 2144 progresses around the log-based, append-only writing structure 2140 in a circular pattern 2142. In one embodiment, the circular pattern 2142 wear balances the solid-state storage media 110, increasing a usable life of the solid-state storage media 110. In the depicted embodiment, a garbage collection module or other storage capacity recovery process has marked several blocks 2148, 2150, 2152, 2154 as invalid, represented by an "X" marking on the blocks 2148, 2150, 2152, 2154. The garbage collection module, in one embodiment, will recover the physical storage capacity of the invalid blocks 2148, 2150, 2152, 2154 and add the recovered capacity to the available storage pool 2146. In the depicted embodiment, modified versions of the blocks 2148, 2150, 2152, 2154 have been appended to the log-based writing structure 2140 as new blocks 2156, 2158, 2160, 2162 in a read, modify, write operation or the like, allowing the original blocks 2148, 2150, 2152, 2154 to be recovered.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for virtual memory management, the method comprising:
   detecting a segmentation fault triggered by a memory access to a virtual memory address within a protected page of data not loaded in main memory of a computing device, wherein the protected page of data is not swappable by a kernel memory manager and is swappable by a user space memory manager;
   in response to detecting the segmentation fault, the user space memory manager:
       determining a first address for a loaded page of data in the main memory, the first address associated in an index with a first deterministic storage location;
       storing the loaded page on a persistent storage device at the first deterministic storage location; and
       copying the protected page from a second deterministic storage location to the main memory, the second deterministic storage location associated with a second address in the index.

2. The method of claim 1, wherein storing the loaded page further comprises associating the first address with the loaded page in the index.

3. The method of claim 1, wherein the first and second deterministic storage locations are located on and are managed by the persistent storage device.

4. The method of claim 1, wherein each deterministic storage location comprises a physical address of an append point of a sequential log-based writing structure persisted on the persistent storage device, wherein the sequential log-based writing structure stores the loaded page together with the address, the index associating the address of the sparse virtual address space with physical media storage locations.

5. The method of claim 4, the method further comprising swapping the loaded page back into main memory and storing the loaded page on a subsequent swap at a third deterministic location and updating the index to associate the third deterministic location with the first address.

6. The method of claim 1, wherein determining the first address further comprises determining the first address for the loaded page based on content of the loaded page and wherein storing the loaded page further comprises:
   skipping storing the loaded page to the persistent storage device in response to determining that the first address matches an existing address associated with an existing page stored on the persistent storage device; and
   incrementing a reference count associated with the existing address.

7. The method of claim 1, further comprising designating a set of virtual memory addresses that correspond to the protected page.

8. The method of claim 1, further comprising returning from the segmentation fault such that an application that allocated the protected page accesses the protected page.

9. The method of claim 1, further comprising receiving a hint from an application regarding virtual memory usage, the hint comprising an instruction to one of, move one or more particular pages from the main memory to the persistent storage device, move one or more particular pages from the persistent storage device to main memory, pin one or more particular pages in main memory, and unpin one or more particular pages in main memory.

10. The method of claim 1, further comprising updating a page table entry for the protected page to indicate the protected page is loaded in main memory.

11. An apparatus for virtual memory management, the apparatus comprising:
   a determination module configured to determine a first address for a loaded page of data in Random Access Memory (RAM), the first address associated in an index with a first deterministic storage location;
   a storing module configured to store the loaded page on a persistent storage device at the first deterministic storage location;
   a moving module configured to load a monitored page of data not loaded in RAM from a second deterministic storage location on a persistent storage device to the RAM by a user space memory manager in response to detecting a segmentation fault, the second deterministic storage location associated with a second address in the index; and
   a designation module configured to designate a set of virtual memory addresses that correspond to the monitored page and to issue a command to mark the set of virtual memory addresses as protected such that the set of virtual memory addresses is not swappable by a kernel memory manager for the RAM and is swappable by the user space memory manager.

12. The apparatus of claim 11, wherein the storing module is configured to associate the first address with the loaded page in the index.

13. The apparatus of claim 11, wherein each deterministic storage location comprises a physical address of an append point of a sequential log-based writing structure persisted on the persistent storage device, wherein the sequential log-based writing structure stores the loaded page together with the address, the index associating the address of the sparse virtual address space with physical media storage locations.

14. The apparatus of claim 13, wherein the storing module is further configured to store the loaded page on a subsequent swap at a third deterministic location and to update the index to associate the third deterministic location with the first address.

15. The apparatus of claim 11, wherein the determination module is configured to determine the first address for the loaded page based on content of the loaded page and to store the loaded page by:
    skipping storing the loaded page to the persistent storage device in response to determining that the first address matches an existing address associated with an existing page stored on the persistent storage device; and
    incrementing a reference count associated with the existing address.

16. The apparatus of claim 11, wherein the memory access triggers one of a segmentation fault and a page fault.

17. The apparatus of claim 11, further comprising an optimization module configured to receive a hint from an application regarding virtual memory usage, the hint comprising an instruction to one of, move one or more particular pages from the RAM to the persistent storage device, move one or more particular pages from the persistent storage device to RAM, pin one or more particular pages in RAM, and unpin one or more particular pages in RAM.

18. A system for virtual memory management, the system comprising:
    a persistent storage device in communication with a host device;
    a user space library comprising,
        a detection module configured to detect a segmentation fault triggered by a memory access to a virtual memory address within a protected range of virtual memory addresses not loaded in volatile memory of a computing device, the protected range of virtual memory addresses marked as not swappable by a kernel memory manager for the volatile memory and is swappable by a user space memory manager;
        a determination module configured to determine a first address for a loaded page of data in volatile memory, the first address associated in an index with a first deterministic storage location;
        a storing module configured to store the loaded page on a persistent storage device at the first deterministic storage location; and
        a moving module configured to move data at the protected range of virtual memory addresses from a second deterministic storage location to volatile memory in response to detecting a segmentation fault, the second deterministic storage location associated with a second address in the index.

19. The system of claim 18, wherein the protected range of virtual memory addresses that is marked as not swappable by the kernel memory manager is swappable by the user space library in response to the detection module detecting the segmentation fault.

20. A method comprising:
    receiving a memory request to a virtual memory address within a protected range of virtual memory addresses having data stored on a persistent storage device, wherein the protected range of virtual memory addresses is not swappable by a kernel memory manager and is swappable by a user space memory manager;
    storing data residing in main memory pertaining to a second range of virtual memory addresses to a persistent storage device at a first deterministic storage location, the first deterministic storage location associated with a first virtual memory address in an index; and
    transferring, via the user space memory manager in response to detecting a segmentation fault, data for the protected range from a second deterministic storage location to a second virtual memory address in the main memory, the second deterministic storage location associated in the index with the second virtual memory address.

21. The method of claim 20, wherein a range of virtual memory addresses, beginning at the second virtual memory address and having a size of the protected range, includes the virtual memory address of the memory request.

22. The method of claim 20, wherein the memory request triggers a segmentation fault, the method further comprising returning from the segmentation fault such that an application that initiated the memory request accesses the data at the requested virtual memory address.

23. The method of claim 20, wherein the first deterministic storage location is determined by hashing at least the first virtual memory address and the second deterministic location is determined by hashing at least the second virtual memory address.

* * * * *